(12) United States Patent
Cho et al.

(10) Patent No.: US 12,437,871 B2
(45) Date of Patent: Oct. 7, 2025

(54) HEALTH CARE SYSTEM FOR COMPANION ANIMALS BASED ON LIFELOG DATA AND INQUIRY DATA AND METHOD OF OPERATING THE SAME

(71) Applicant: People In Soft Co., LTD, Sejong-si (KR)

(72) Inventors: Dong Jin Cho, Goyang-si (KR); Min Jae Kim, Seongnam-si (KR)

(73) Assignee: People In Soft Co., LTD, Sejong-si (KR)

( * ) Notice: Subject to any disclaimer, the term of this patent is extended or adjusted under 35 U.S.C. 154(b) by 849 days.

(21) Appl. No.: 17/646,329

(22) Filed: Dec. 29, 2021

(65) Prior Publication Data
US 2023/0154613 A1 May 18, 2023

(30) Foreign Application Priority Data
Nov. 17, 2021 (KR) .................. 10-2021-0158272

(51) Int. Cl.
*G16H 50/20* (2018.01)
*G16H 10/20* (2018.01)
*G16H 10/60* (2018.01)

(52) U.S. Cl.
CPC ............. *G16H 50/20* (2018.01); *G16H 10/20* (2018.01); *G16H 10/60* (2018.01)

(58) Field of Classification Search
CPC ........ G16H 50/20; G16H 10/20; G16H 10/60; G16H 15/00; G16H 20/60; G16H 40/67;
(Continued)

(56) References Cited

U.S. PATENT DOCUMENTS

| | | | |
|---|---|---|---|
| 2014/0052463 A1* | 2/2014 | Cashman | G06Q 10/1095 705/2 |
| 2014/0122118 A1* | 5/2014 | Farr | G16H 40/67 705/3 |

(Continued)

FOREIGN PATENT DOCUMENTS

| | | |
|---|---|---|
| KR | 10-2016-0036801 A | 4/2016 |
| KR | 10-2016-0112531 A | 9/2016 |

(Continued)

OTHER PUBLICATIONS

Dillon, K; Coley, K.; Olufunmilola, A.; McGivney, M.; and Berenbrok, L. "Identifying the role community pharmacists can play in supporting pet owners' medication-related Needs." Journal of the American Pharmacists Association 57.3 Elsevier B.V. University of Pittsburgh, School of Pharmacy. (Year: 2017).*

(Continued)

*Primary Examiner* — Linh Giang Le
(74) *Attorney, Agent, or Firm* — Sughrue Mion, PLLC

(57) ABSTRACT

The present disclosure relates to a health care system for companion animals and a method of operating the same. The health care system according to one embodiment of the present disclosure includes a data collector for collecting lifelog data including basic information and biometric information about a user's companion animal; a self-diagnosis device for providing a plurality of questionnaire data to the user to perform self-diagnosis of the health condition of the companion animal and receiving feedback information reflecting a response of the user to the provided questionnaire data from the user; a health condition judgment device for judging the health condition of the companion animal based on the collected lifelog data and the feedback information; and a service determining device for determining at least one health care service to be provided to the user (Continued)

among a health coaching service and a medical service based on the judged health condition.

13 Claims, 15 Drawing Sheets

(58) Field of Classification Search
CPC ........ G16H 80/00; G16H 50/30; G16H 50/70; A61B 5/7465; A61B 2503/40; G06N 20/00; G06Q 10/02
See application file for complete search history.

(56) References Cited

U.S. PATENT DOCUMENTS

2020/0381119 A1* 12/2020 Gibbs .................... G16H 40/67
2022/0068454 A1* 3/2022 Raskin .................. G16H 50/70

FOREIGN PATENT DOCUMENTS

| KR | 10-2019-0079157 | A | | 7/2019 |
| KR | 10-2019-0101002 | A | | 8/2019 |
| KR | 10-2020-0005952 | A | | 1/2020 |
| KR | 20210098065 | A | * | 1/2020 |
| KR | 10-2187344 | B1 | | 12/2020 |
| KR | 10-2021-0100458 | A | | 8/2021 |

OTHER PUBLICATIONS

Korean Office Action issued Nov. 20, 2023 in Application No. 10-2021-0158272.

* cited by examiner

HEALTH CARE SYSTEM FOR COMPANION ANIMALS BASED ON LIFELOG DATA AND INQUIRY DATA AND METHOD OF OPERATING THE SAME

CROSS-REFERENCE TO RELATED APPLICATION

This application claims priority to Korean Patent Application No. 10-2021-0158272, filed on Nov. 17, 2021 in the Korean Intellectual Property Office, the disclosure of which is incorporated herein by reference.

BACKGROUND OF THE DISCLOSURE

Field of the Disclosure

The present disclosure relates to a health care system for companion animals and a method of operating the same, and more particularly, to a technical idea for providing a health care service based on lifelog data and questionnaire data of companion animals.

Description of the Related Art

Recently, as interest in pets increases, the term "companion animal", which means a family member, is used instead of a pet at home.

Like humans, pets will inevitably get sick throughout their lives and will receive treatment accordingly. Disease treatment may be carried out over a short period of time or, in severe cases, throughout a life. During disease treatment, health care including exercise, diet, and medication is required.

However, in most cases, companion animal owners do not spend the entire day with their companion animals and are away from them for most of the day. Accordingly, real-time monitoring and health management of companion animals is difficult.

Accordingly, there is increasing demand for technology of providing health care services for companion animals based on continuous monitoring, such as preventing obesity by improving eating habits and increasing the amount of exercise, removing disease-causing causes in advance, and providing optimal medical solutions to owners when diseases occur.

Like humans, in the case of companion animals, early diagnosis and prevention of diseases are possible through continuous monitoring. Nevertheless, due to limitations in time and cost, most companion animals do not receive health care such as continuous monitoring for diseases. Accordingly, most companion animals do not receive adequate treatment for mild diseases.

In addition, in the case of directly visiting a veterinary hospital for treatment, companion animal owners consume travel time, transportation costs, and medical expenses, which may be a burden to the owners.

In addition, in a situation that requires an immediate diagnosis and appropriate response, delayed diagnosis and response may cause serious health problems to companion animals.

For example, in a situation where an owner need to urgently receive a diagnosis during non-business hours of the veterinary hospital, such as weekends or at night, and take minimal emergency treatment, the owner has to spend a lot of time to find an open veterinary hospital and travel to the hospital. Until now, since emergency facilities for companion animals are not provided, there is no appropriate countermeasure in case of an emergency.

Therefore, to solve these problems, need for remote diagnosis and self-diagnosis of companion animals is rapidly increasing.

RELATED ART DOCUMENTS

Patent Documents

Korean Patent Application Publication No. 10-2187344, "METHOD AND DEVICE FOR DIAGNOSING COMPANION ANIMALS USING DECISION TREE"
Korean Patent No. 10-2020-0005952, "COMPANION ANIMAL STATUS NOTIFICATION SYSTEM"

SUMMARY OF THE DISCLOSURE

Therefore, the present disclosure has been made in view of the above problems, and it is an object of the present disclosure to provide a health care system for companion animals that provides optimized health care services in consideration of self-diagnosis results based on lifelog data and questionnaire data of companion animals and a method of operating the health care system.

It is another object of the present disclosure to provide a health care system for companion animals that accurately judges the health condition of companion animals through an artificial intelligence-based judgment model and a method of operating the health care system.

It is yet another object of the present disclosure to provide a health care system for companion animals that provides users with the current health condition of companion animals and health care services according to the health condition so that the users efficiently and continuously manage the health of companion animals and a method of operating the health care system.

In accordance with one aspect of the present disclosure, provided is a health care system for companion animals including a data collector for collecting lifelog data including basic information and biometric information about a companion animal of a user; a self-diagnosis device for providing a plurality of questionnaire data to the user to perform self-diagnosis of a health condition of the companion animal and receiving feedback information reflecting a response of the user to the provided questionnaire data from the user; a health condition judgment device for judging a health condition of the companion animal based on the collected lifelog data and the feedback information; and a service determining device for determining at least one health care service to be provided to the user among a health coaching service and a medical service based on the judged health condition.

According to one aspect of the present disclosure, the basic information may include at least one of breed information, age information, weight information, diet information, calorie intake information, medical history information, and inoculation information of the companion animal input by the user.

According to one aspect of the present disclosure, the biometric information may include at least one of heart rate information, body temperature information, posture information, voice information, activity information, and behavior information of the companion animal collected through a wearable device worn by the companion animal.

According to one aspect of the present disclosure, the self-diagnosis device may provide the user with symptom questionnaire data and N pieces of condition questionnaire data (N being a positive integer) corresponding to a response of the user to the symptom questionnaire data.

According to one aspect of the present disclosure, the self-diagnosis device may provide N−1th condition questionnaire data among the N pieces of condition questionnaire data to a user, and may provide Nth condition questionnaire data corresponding to a response of the user to the N−1th condition questionnaire data to the user.

According to one aspect of the present disclosure, the symptom questionnaire data may be information for confirming occurrence of at least one symptom of blindness/visual impairment, epiphora/tear overflow, tear overflow, red eye, blood in the eye, bulging/protruding eye, dilated pupil, eye discharge, eye being out of the socket, eye mass, painful eye, swollen eye, forelimb lameness, limping, hindlimb lameness, limping, multiple joint/limb lameness, limping, muscle wasting/cachexia, joint swelling, broken bone, broken nail, broken tail, fell off something, muscle atrophy, muscle tremors, painful tail, failure to observe oestrus, irregular seasons, infertility in the female with normal oestrus, male infertility, vaginal/vulval discharge, abortion, dystocia, abnormal mammary glands, bleeding from vulva, licking vulva, nursing issues, swollen vulva, vaginal prolapse, whelping issues, pollakiuria/dysuria, excessive urine volume/frequency, polyuria/polydipsia, anuria/oligonuria, not urinating, hematuria, blood in urine, urinary incontinence, urine dribbling, peeing on bed in sleep, strong smelling odor in urine, discolored urine, stranguria/difficulty urinating, behavior problems, altered behavior: general changes, stares blankly at walls, floor, or into space, walking into doors or walls, inability to recognize familiar people or pets, getting lost in home or yard, pacing, excessive vocalizing, scooting, aggressive behavior, anxiety/phobias, fear of thunderstorm, fear of people unfamiliar, compulsive behavior disorders, excessive selfgrooming, flank sucking, repetitive circling, repetitive chewing, inappropriate elimination/defecation/urination, peeing on bed in sleep, licking paw, pacing, not drinking, dental problems, halitosis, bad breath, broken tooth, loose tooth, mass in oral cavity, swelling below the eye socket, painful mouth, other problems, ate digestive medication, ate food with unknown artificial sweetener, ate foreign body, ate gorilla glue or other expanding polyurethane glue, ate hand warmer or oxygen absorber, ate household item, ate medication containing Ivermectin, ate muscle relaxant, ate sago palm, ate stimulants or ADHD medication, ate super glue or other non-expanding glue, ate tobacco or nicotine product, ate urine acidifier or lawn saver supplement, ate/exposed to antibiotics, ate/exposed to plants or flowers, ate/exposed to topical psoriasis medication, bee sting, bitten by black widow or other venomous spider, bitten by unknown spider, bitten by venomous snake or lizard, carbon monoxide poisoning, drank alcoholic beverage, drank coffee/tea or ate caffeinated product, electric shock, gunshot wounds, hit by car, insect bite, rabies exposure, smoke inhalation, stung by scorpion, blindness/visual impairment, epiphora/tear overflow, tear overflow, red eye, blood in the eye, bulging/protruding eye, dilated pupil, eye discharge, eye being out of the socket, eye mass, painful eye, swollen eye, forelimb lameness, limping, hindlimb lameness, limping, multiple joint/limb lameness, limping, muscle wasting/cachexia, joint swelling, broken bone, broken nail, broken tail, fell off something, muscle atrophy, muscle tremors, painful tail, failure to observe oestrus, irregular seasons, infertility in the female with normal oestrus, male infertility, vaginal/vulval discharge, abortion, dystocia, abnormal mammary glands, bleeding from vulva, licking vulva, nursing issues, swollen vulva, vaginal prolapse, whelping issues, pollakiuria/dysuria, excessive urine volume/frequency, polyuria/polydipsia, anuria/oligonuria, not urinating, hematuria, blood in urine, urinary incontinence, urine dribbling, peeing on bed in sleep, strong smelling odor in urine, discolored urine, stranguria/difficulty urinating, behavior problems, altered behavior: general changes, stares blankly at walls, floor, or into space, walking into doors or walls, inability to recognize familiar people or pets, getting lost in home or yard, pacing, excessive vocalizing, scooting, aggressive behavior, anxiety/phobias, fear of thunderstorm, fear of people unfamiliar, compulsive behavior disorders, excessive selfgrooming, flank sucking, repetitive circling, repetitive chewing, inappropriate elimination/defecation/urination, peeing on bed in sleep, licking paw, pacing, not drinking, dental problems, halitosis, bad breath, broken tooth, loose tooth, mass in oral cavity, swelling below the eye socket, painful mouth, other problems, ate digestive medication, ate food with unknown artificial sweetener, ate foreign body, ate gorilla glue or other expanding polyurethane glue, ate hand warmer or oxygen absorber, ate household item, ate medication containing Ivermectin, ate muscle relaxant, ate sago palm, ate stimulants or ADHD medication, ate super glue or other non-expanding glue, ate tobacco or nicotine product, ate urine acidifier or lawn saver supplement, ate/exposed to antibiotics, ate/exposed to plants or flowers, ate/exposed to topical psoriasis medication, bee sting, bitten by black widow or other venomous spider, bitten by unknown spider, bitten by venomous snake or lizard, carbon monoxide poisoning, drank alcoholic beverage, drank coffee/tea or ate caffeinated product, electric shock, gunshot wounds, hit by car, insect bite, rabies exposure, smoke inhalation, and stung by scorpion.

According to one aspect of the present disclosure, the health condition judgment device may judge the health condition through an artificial intelligence-based disease judgment model that receives the collected lifelog data and the feedback information as input data and outputs at least one of disease information and risk information corresponding to the input data.

According to one aspect of the present disclosure, the service determining device may provide, based on the judged health condition, the health coaching service including at least one of a medical service, a telemedicine service, a remote consultation service, a diet management service, an exercise management service, and a lifestyle management service to a preset user terminal.

According to one aspect of the present disclosure, the service determining device may provide, based on the judged health condition, the medical service including at least one of an online reservation service for a veterinary hospital and a telemedicine service to a preset user terminal.

According to one aspect of the present disclosure, the online reservation service for a veterinary hospital may be a service that recommends at least one veterinary hospital through the user terminal based on location information of at least one of the user and the companion animal and makes an online reservation for a veterinary hospital selected by the user from among the recommended veterinary hospitals.

According to one aspect of the present disclosure, the telemedicine service may be a service that matches the user with at least one veterinarian recommended through a system among a plurality of veterinarians within an available pool and provides remote consultation or telemedicine between the matched veterinarian and the user based on at least one of text message, chatting, and video call.

According to one aspect of the present disclosure, the service determining device may match the at least one veterinarian with the user based on location information of at least one of the user and the companion animal.

According to one aspect of the present disclosure, the service determining device may provide at least one of the collected lifelog data, the feedback information, and the judged health condition information to a terminal of the matched veterinarian.

According to one aspect of the present disclosure, the service determining device may control at least one of the collected lifelog data and information according to the health coaching service to be visualized in the preset user terminal.

In accordance with another aspect of the present disclosure, provided is a method of managing health of a companion animal, the method including collecting, in a data collector, lifelog data including basic information and biometric information about a companion animal of a user; providing, in a self-diagnosis device, a plurality of questionnaire data to the user to perform self-diagnosis of a health condition of the companion animal and receiving feedback information reflecting a response of the user to the provided questionnaire data from the user; judging, in a health condition judgment device, a health condition of the companion animal based on the collected lifelog data and the feedback information; and determining, in a service determining device, at least one health care service to be provided to the user among a health coaching service and a medical service based on the judged health condition.

BRIEF DESCRIPTION OF THE DRAWINGS

The above and other objects, features and other advantages of the present disclosure will be more clearly understood from the following detailed description taken in conjunction with the accompanying drawings, in which:

FIGS. 7A and 7B show exemplary supplementary services provided through a health care system for companion animals according to one embodiment.

DETAILED DESCRIPTION OF THE DISCLOSURE

Figure 1:
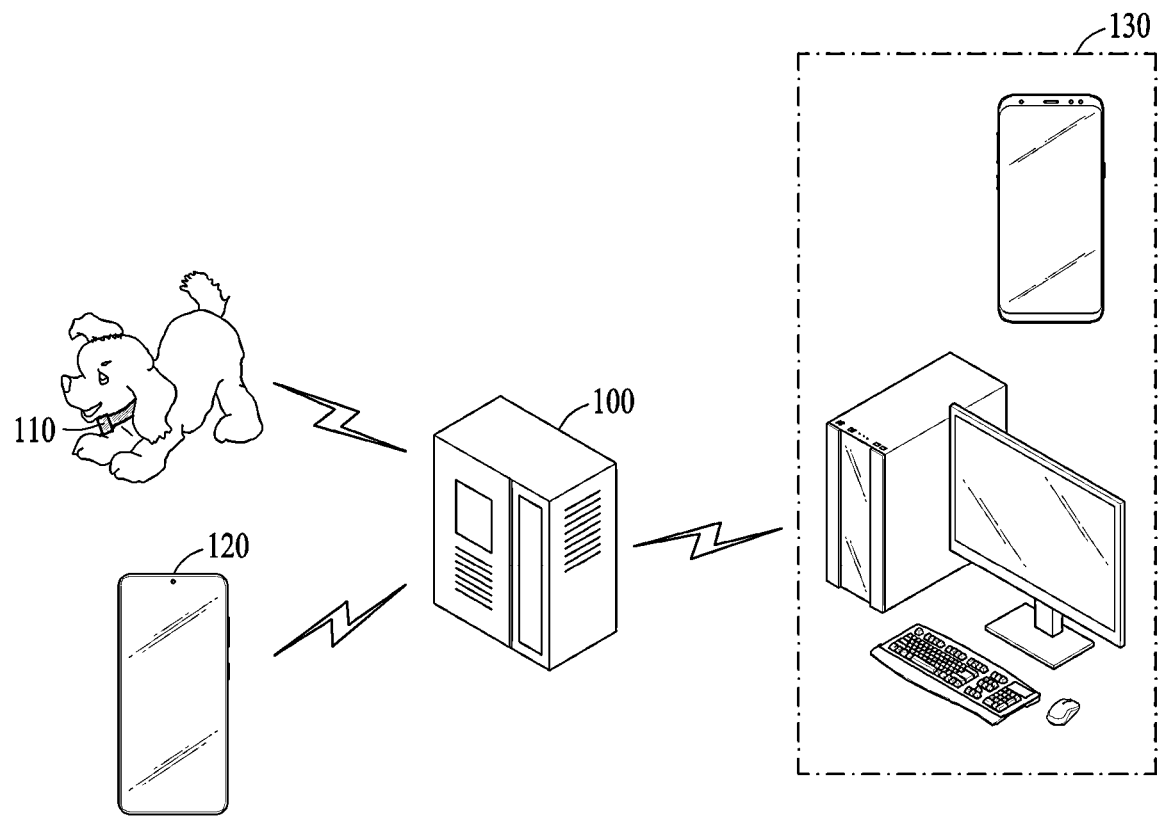
FIG. 1 includes drawings for explaining a health care system for companion animals according to one embodiment.

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present disclosure.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Other words used to describe the relationship between elements or layers should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings. However, the scope of the present disclosure is not limited by these embodiments. Like reference numerals in the drawings denote like elements.

FIG. 1 includes drawings for explaining a health care system for companion animals according to one embodiment.

Referring to FIG. 1, in a health care system 100, a wearable device 100 worn by a companion animal and a preset user terminal 120 are connected through wired or wireless communication. The health care system 100 may collect self-diagnosis results based on lifelog data and questionnaire data of a companion animal, and may judge the health condition of the companion animal based on the collected lifelog data and the self-diagnosis results. For example, the health care system 100 may be implemented in the form of a separate server.

In addition, based on the judgment results on the health condition, the health care system 100 may determine a health care service optimized for the companion animal, and may provide the determined health care service to a user through a user terminal 120. For example, the health care system 100 may provide the determined health care service to the user terminal 120 through a dedicated application.

According to one aspect of the present disclosure, the health care system 100 may provide at least one service of a diet management service, an exercise management service, a lifestyle management service, an online reservation service for a veterinary hospital, and a telemedicine service through the user terminal 120.

In addition, the health care system 100 may be connected to a terminal 130 of a veterinarian using a web or an app through wired or wireless communication to provide a telemedicine service to the user.

The health care system according to one embodiment will be described in more detail later with reference to FIG. 2.

Figure 2:
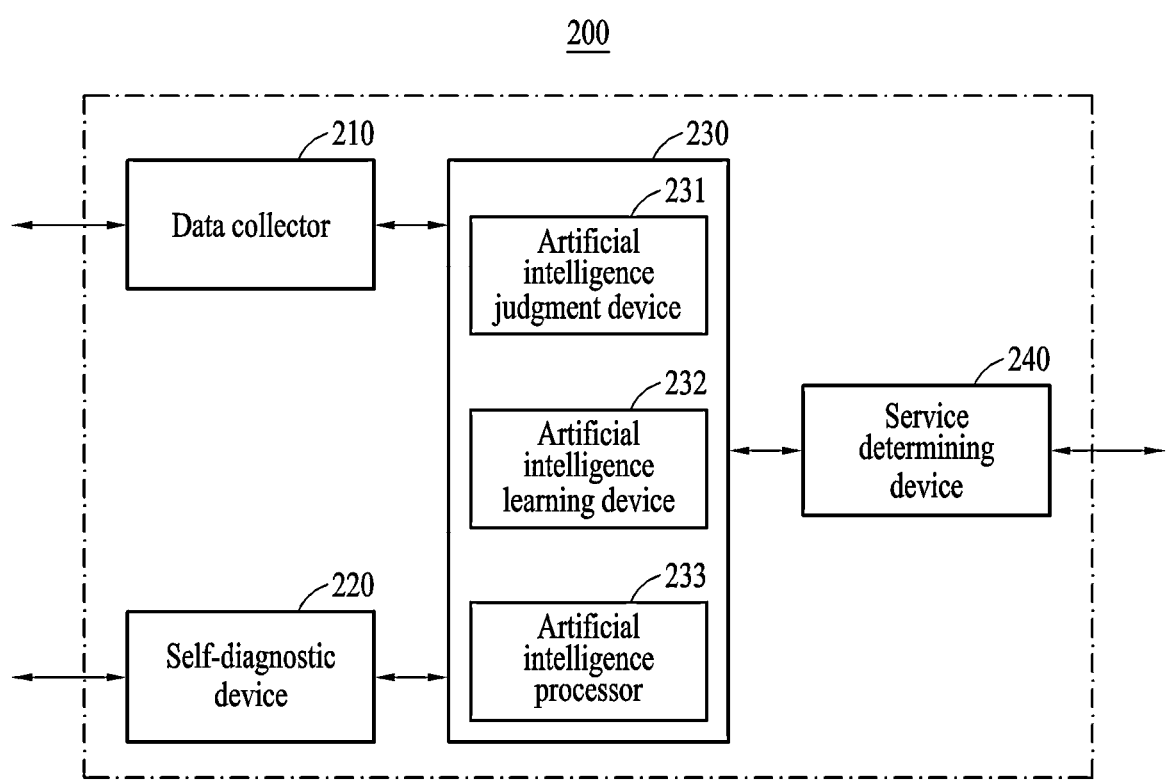
FIG. 2 is a block diagram for specifically explaining a health care system for companion animals according to one embodiment.

FIG. 2 is a block diagram for specifically explaining a health care system for companion animals according to one embodiment.

Referring to FIG. 2, a health care system 200 according to one embodiment may provide optimized health care services to a companion animal in consideration of self-diagnosis results based on lifelog data and questionnaire data of the companion animal.

In addition, the health care system 200 may accurately judge the health condition of a companion animal through an artificial intelligence-based judgment model.

In addition, the health care system 200 may provide a user with the current health condition of a companion animal and a health care service according to the health condition. Based on the provided health condition and health care service, the user may easily manage the health of the companion animal.

To implement these functions, the health care system 200 may include a data collector 210, a self-diagnosis device 220, a health condition judgment device 230, and a service determining device 240.

The data collector 210 according to one embodiment may collect lifelog data including basic information and biometric information about a user's companion animal. For example, the data collector 210 may collect lifelog data in real time or every preset period.

According to one aspect of the present disclosure, the basic information may include at least one of breed information, age information, weight information, diet information, calorie intake information, medical history information, and inoculation information of a companion animal input by a user.

For example, the medical history information may include a medical history and treatment result information due to at least one of subnutrition, renal failure, a heart disease, allergy, patellar dislocation, arthritis, periodontitis, postoperative recovery, atopic dermatitis, otitis externa, dermatosis, slipped disk, bronchial stenosis, obesity, cataract, and diabetes.

According to one aspect of the present disclosure, the biometric information may include at least one of heart rate information, body temperature information, posture information, voice information, activity information, and behavior information of a companion animal, which are collected through a wearable device worn by the companion animal.

For example, the wearable device may be formed in the form of a necklace and worn on the neck of a companion animal, and may include one or more biometric sensors to collect biometric information of the companion animal.

Specifically, the wearable device may collect sensing data corresponding to heart rate information of a companion animal by using a heart rate sensor, may collect sensing data corresponding to body temperature information of the companion animal by using a temperature sensor, may collect sensing data corresponding to posture information of the companion animal by using a Gyro sensor, and may collect sensing data corresponding to voice information of the companion animal by using a microphone.

In addition, the wearable device may collect sensing data corresponding to the activity/behavior of a companion animal by using a 6-axis sensor (acceleration sensor+Gyro sensor). For example, the behavioral information may include at least one behavioral information of turning around, eating, scratching, digging the floor, and shaking the tail, without being limited thereto.

According to one aspect of the present disclosure, at least one of the data collector 210 and the wearable device may further include an artificial intelligence (AI)-based behavior identification model for generating behavior information from sensing data of a companion animal.

In addition, the lifelog data may further include image information of a companion animal photographed through a camera installed in a preset space and location information of the companion animal obtained through a location sensor (for example, global positioning system (GPS) sensor) provided in a wearable device.

The self-diagnosis device 220 according to one embodiment may provide a plurality of questionnaire data to a user to perform self-diagnosis of the health condition of a companion animal, and may receive feedback information reflecting a user's response to the provided questionnaire data from the user.

For example, the self-diagnosis device 220 may provide questionnaire data to a user terminal and receive a response to the questionnaire data by using a chatbot.

According to one aspect of the present disclosure, the self-diagnosis device 220 may provide a user with symptom questionnaire data and N pieces of condition questionnaire data (N being a positive integer) corresponding to a user' response to the symptom questionnaire data. Here, the symptom questionnaire data may be information for confirming occurrence of at least one symptom of blindness/visual impairment, epiphora/tear overflow, tear overflow, red eye, blood in the eye, bulging/protruding eye, dilated pupil, eye discharge, eye being out of the socket, eye mass, painful eye, swollen eye, forelimb lameness, limping, hindlimb lameness, limping, multiple joint/limb lameness, limping, muscle wasting/cachexia, joint swelling, broken bone, broken nail, broken tail, fell off something, muscle atrophy, muscle tremors, painful tail, failure to observe oestrus, irregular seasons, infertility in the female with normal oestrus, male infertility, vaginal/vulval discharge, abortion, dystocia, abnormal mammary glands, bleeding from vulva, licking vulva, nursing issues, swollen vulva, vaginal prolapse, whelping issues, pollakiuria/dysuria, excessive urine volume/frequency, polyuria/polydipsia, anuria/oligonuria, not urinating, hematuria, blood in urine, urinary incontinence, urine dribbling, peeing on bed in sleep, strong smelling odor in urine, discolored urine, stranguria/difficulty urinating, behavior problems, altered behavior: general changes, stares blankly at walls, floor, or into space, walking into doors or walls, inability to recognize familiar people or pets, getting lost in home or yard, pacing, excessive vocalizing, scooting, aggressive behavior, anxiety/phobias, fear of thunderstorm, fear of people unfamiliar, compulsive behavior disorders, excessive selfgrooming, flank sucking, repetitive circling, repetitive chewing, inappropriate elimination/defecation/urination, peeing on bed in sleep, licking paw, pacing, not drinking, dental problems, halitosis, bad breath, broken tooth, loose tooth, mass in oral cavity, swelling below the eye socket, painful mouth, other problems, ate digestive medication, ate food with unknown artificial sweetener, ate foreign body, ate gorilla glue or other expanding polyurethane glue, ate hand warmer or oxygen absorber, ate household item, ate medication containing Ivermectin, ate muscle relaxant, ate sago palm, ate stimulants or ADHD medication, ate super glue or other non-expanding glue, ate tobacco or nicotine product, ate urine acidifier or lawn saver supplement, ate/exposed to antibiotics, ate/exposed to plants or flowers, ate/exposed to topical psoriasis medication, bee sting, bitten by black widow or other venomous spider, bitten by unknown spider, bitten by venomous snake or lizard, carbon monoxide poisoning, drank alcoholic beverage, drank coffee/tea or ate caffeinated product, electric shock, gunshot wounds, hit by car, insect bite, rabies exposure, smoke inhalation, stung by scorpion, blindness/visual impairment, epiphora/tear overflow, tear overflow, red eye, blood in the eye, bulging/protruding eye, dilated pupil, eye discharge, eye being out of the socket, eye mass, painful eye, swollen eye, forelimb lameness, limping, hindlimb lameness, limping, multiple joint/limb lameness, limping, muscle wasting/cachexia, joint swelling, broken bone, broken nail, broken tail, fell off something, muscle atrophy, muscle tremors, painful tail, failure to observe oestrus, irregular seasons, infertility in the female with normal oestrus, male infertility, vaginal/vulval discharge, abortion, dystocia, abnormal mammary glands, bleeding from vulva, licking vulva, nursing issues, swollen vulva, vaginal prolapse, whelping issues, pollakiuria/dysuria, excessive urine volume/frequency, polyuria/polydipsia, anuria/oligonuria, not urinating, hematuria, blood in urine, urinary incontinence, urine dribbling, peeing on bed in sleep, strong smelling odor in urine, discolored urine, stranguria/difficulty urinating, behavior problems, altered behavior: general changes, stares blankly at walls, floor, or into space, walking into doors or walls, inability to recognize familiar people or pets, getting lost in home or yard, pacing, excessive vocalizing, scooting, aggressive behavior, anxiety/phobias, fear of thunderstorm, fear of people unfamiliar, compulsive behavior disorders, excessive selfgrooming, flank sucking, repetitive circling, repetitive chewing, inappropriate elimination/defecation/urination, peeing on bed in sleep, licking paw, pacing, not drinking, dental problems, halitosis, bad breath, broken tooth, loose tooth, mass in oral cavity, swelling below the eye socket, painful mouth, other problems, ate digestive medication, ate food with unknown artificial sweetener, ate foreign body, ate gorilla glue or other expanding polyurethane glue, ate hand warmer or oxygen absorber, ate household item, ate medication containing Ivermectin, ate muscle relaxant, ate sago palm, ate stimulants or ADHD medication, ate super glue or other non-expanding glue, ate tobacco or nicotine product, ate urine acidifier or lawn saver supplement, ate/exposed to antibiotics, ate/exposed to plants or flowers, ate/exposed to topical psoriasis medication, bee sting, bitten by black widow or other venomous spider, bitten by unknown spider, bitten by venomous snake or lizard, carbon monoxide poisoning, drank alcoholic beverage, drank coffee/tea or ate caffeinated product, electric shock, gunshot wounds, hit by car, insect bite, rabies exposure, smoke inhalation, and stung by scorpion, but the present disclosure is not limited to these symptoms.

Specifically, the self-diagnosis device 220 may provide N−1th condition questionnaire data among N pieces of condition questionnaire data to a user, and may provide Nth condition questionnaire data corresponding to a user's response to the N−1th condition questionnaire data to the user.

That is, the self-diagnosis device 220 may narrow a diagnosis range for the health condition and disease of a companion animal through a self-diagnosis process in which a user's response to a question is considered and the next question is determined. Through this process, self-diagnosis accuracy may be improved.

The health condition judgment device 230 according to one embodiment may include an artificial intelligence judgment device 231 for judging the health condition of a companion animal based on at least one of the collected lifelog data and the feedback information. That is, the health condition judgment device 230 may use the artificial intelligence judgment device 231 to judge the health condition of a companion animal by considering self-diagnosis results based on basic information, biometric information, and questionnaire data of the companion animal collected in real time.

According to one aspect of the present disclosure, the health condition judgment device 230 may use the artificial intelligence judgment device 231 to judge a health condition through an artificial intelligence-based disease judgment model that receives collected lifelog data and feedback information as input data and outputs at least one of disease information and risk information corresponding to the input data.

In addition, the health condition judgment device 230 may include an artificial intelligence learning device 232 that performs learning based on a disease judgment model based on artificial intelligence and an artificial intelligence processor 233 that performs a process of judging a health condition using a learned disease judgment model. In addition, by using the artificial intelligence learning device 232 and the artificial intelligence processor 233, artificial intelligence-based self-diagnosis may be implemented.

For artificial intelligence-based self-diagnosis, the artificial intelligence learning device 232 may generate or learn an artificial intelligence-based judgment model by algorithmizing questionnaire processes when veterinarians treat animals in veterinary hospitals.

The artificial intelligence-based judgment model is a diagnostic method called veterinary differential diagnosis (DDx), which narrows the scope of diagnosis through questionnaires, starting with indicator symptoms (main symptoms).

For example, the artificial intelligence-based judgment model refers to an algorithm in the form of continuing the next question according to a response to the question rather than simply a questionnaire, such as Q1=A1=Q2/Q1=A2→Q3.

The artificial intelligence-based judgment model may build an initial algorithm with a domain of specialized differential diagnostics.

The artificial intelligence-based judgment model may be advanced by using an initial self-diagnosis system to which a built-up professional veterinary-based algorithm is applied and AI technology. Using the medical records of a veterinary hospital, data labeling is performed by classifying charts into companion animal information, indicator symptoms, related symptoms, test results (blood test, heart rate, body temperature, etc.), and final diagnosis, and machine learning is performed based on refined data. Though these processes, a predictive model may be refined, and accuracy may be increased.

For machine learning for the artificial intelligence-based judgment model, medical records from numerous veterinary hospitals are required, and these records may be labeled and made into refined data.

To date, 100,000 up-to-date medical records have been collected from cooperative veterinary hospitals. Thereafter, medical records of companion animals of service users will be secured. By continuously acquiring data through increase in the number of cooperative veterinary hospitals and continuous cooperation with veterinary schools, the artificial intelligence-based judgment model may be updated.

For example, the risk information may be classified into five levels: a normal stage, a worrisome stage, a caution stage, a dangerous stage, and a very-dangerous stage.

According to one aspect of the present disclosure, the disease judgment model is an artificial neural network model. The health condition judgment device 230 may generate the disease judgment model through deep learning based on disease diagnosis data collected in advance and stored in a disease information database.

According to one aspect of the present disclosure, the health condition judgment device 230 may collect atypical disease information through the data collector 210, may standardize the collected atypical disease information through a pre-processing process, and may categorize the standardized disease information to construct a disease information database.

Specifically, the data collector 210 may collect disease information (i.e., atypical disease information) including at least one of a text, an image, and a video transmitted from at least one means of the terminal of a veterinarian recommended from an available pool through a system, a medical professional site, a portal site, and a social network service (SNS).

For example, the atypical disease information may include basic information (e.g., breed, age, and the like) of a companion animal and information related to health, diseases, medical treatment, and surgery about a companion animal, without being limited thereto.

The health condition judgment device 230 may standardize the collected atypical disease information through pre-processing, and may construct a disease information database (i.e., obtaining disease diagnosis data) by classifying the standardized disease information into at least one of behavior according to breed/age, abnormal symptoms in behavior according to breed/age, diagnosis information, disease information, diagnosis method information, treatment method information, diagnosis cost information, treatment cost information, vaccination information, and diet information of a companion animal.

In addition, the health condition judgment device 230 may collect (mining) atypical disease information by providing a mining command to the data collector 210, and may manage previous information stored in a disease information database and information newly collected through mining.

That is, the health condition judgment device 230 may acquire a lot of reliable disease diagnosis data by mining big data obtained from experts and users (or many owners of companion animals).

According to one aspect of the present disclosure, the health condition judgment device 230 may determine, based on a disease judgment model, whether a separation anxiety symptom occurs in a companion animal.

For example, the health condition judgment device 230 may provide the sensing data of a 6-axis sensor collected through the data collector 210 as the input of a disease judgment model. In this case, the disease judgment model may compare the similarity between a pre-learned separation anxiety judgment pattern and the sensing data pattern of the 6-axis sensor to classify the state of a companion animal into any one of a circling state, a howling state, and a relaxed state, and may output the status information of the companion animal as a separation anxiety judgment result.

The service determining device 240 according to one embodiment may determine at least one health care service to be provided to a user among a health coaching service and a medical service based on the judged health condition.

According to one aspect of the present disclosure, the service determining device 240 may determine a health care service in consideration of the life cycle of a companion animal (for example, in the case of a dog, 0 to 1 years old: puppy, 2 to 6 years old: adult dog, 7 to 13 years old: increased disease prevalence, 14 years old: old dog).

In addition, when the level of risk of a companion animal according to a judged health condition is a normal stage or a worrisome stage, the service determining device 240 may determine a health coaching service as a health care service to be provided to a user. When the level of risk of a companion animal is any one of a caution stage, a dangerous stage, and a very-dangerous stage, the service determining device 240 may determine a medical service as a health care service to be provided to a user.

According to one aspect of the present disclosure, the service determining device 240 may provide a health coaching service including at least one of a medical service, a telemedicine service, a remote consultation service, a diet management service, an exercise management service, and a lifestyle management service to a user terminal based on a judged health condition.

For example, the diet management service may be a service that provides a user with recommendations of feed and snack for a companion animal, a feed and snack provision cycle, and notification of feed and snack provision time, the exercise management service may be a service that provides a user with information on personalized exercise and play for a companion animal, and the lifestyle management service may be a service that provides a user with information related to prevention of diseases and stress that may occur in a companion animal.

According to one aspect of the present disclosure, the service determining device 240 may provide a medical service including at least one of an online reservation service for a veterinary hospital and a telemedicine service to a user terminal based on a judged health condition.

For example, the online reservation service for a veterinary hospital may be a service that recommends at least one veterinary hospital through a user terminal based on the location information of at least one of a user and a companion animal and performs an online reservation for a veterinary hospital selected by a user among recommended veterinary hospitals. In this case, the location information of a user and a companion animal may be obtained through a user terminal and a wearable device worn by a companion animal.

In addition, the telemedicine service may be a service that recommends at least one veterinary hospital through a user terminal based on the location information of at least one of a user and a companion animal and performs an online reservation for a veterinary hospital selected by a user among recommended veterinary hospitals.

According to one aspect of the present disclosure, when a telemedicine service is provided to a user, the service determining device 240 may match at least one veterinarian with the user based on the location information of at least one of the user and a companion animal.

According to one aspect of the present disclosure, the service determining device 240 may provide at least one of collected lifelog data, feedback information, and judged health condition information to the terminal of a matched veterinarian. Accordingly, the diagnosis accuracy of the veterinarian may be improved during telemedicine or face-to-face treatment.

According to one aspect of the present disclosure, the service determining device 240 may provide a medical record (medical certificate, prescription, etc.) according to telemedicine or face-to-face treatment to a user.

In addition, the service determining device 240 may induce a user to fill out a document form in advance by providing the user with the document form required for face-to-face treatment. When at least one of a user terminal and a wearable device worn by a companion animal approaches a reserved hospital within a preset distance, the service determining device 240 may transmit a reception request signal to a hospital terminal to induce reception processing to be completed in advance. When the reception is completed, the service determining device 240 may provide documents necessary for medical treatment prepared in advance by the user to the hospital terminal. Accordingly, waiting time for hospital visit may be minimized.

According to one aspect of the present disclosure, the service determining device 240 may provide a billing function according to telemedicine or face-to-face treatment to a user, and may induce the user to actively use the medical treatment service by giving points according to the number of times of use of medical treatment and providing a discount benefit using the points during billing.

In addition, the service determining device 240 may control at least one of collected lifelog data and information according to a health coaching service to be visualized in a user terminal.

Figure 3:
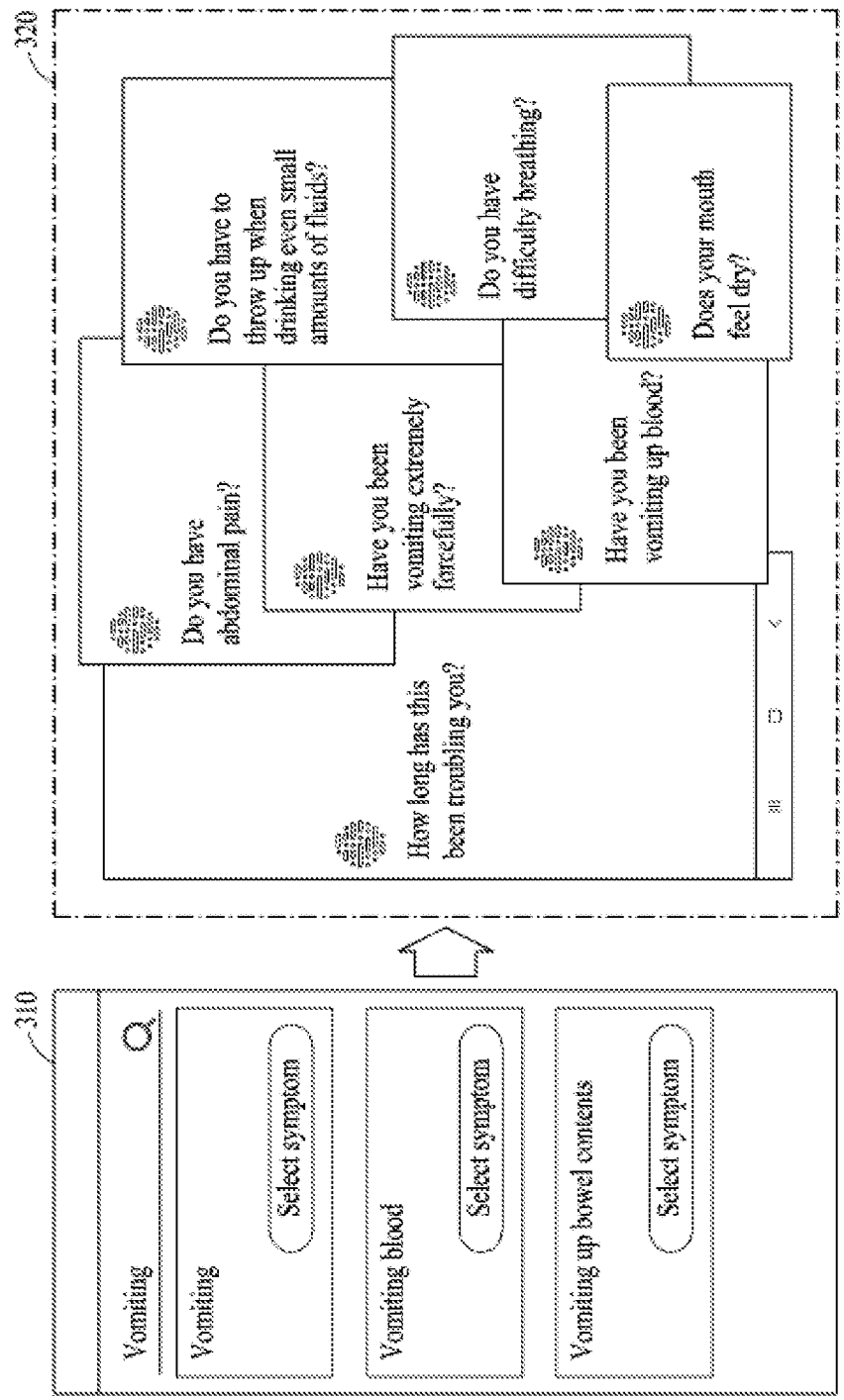
FIG. 3 shows an example of performing self-diagnosis through a health care system for companion animals according to one embodiment.

FIG. 3 shows an example of performing self-diagnosis through a health care system for companion animals according to one embodiment.

Referring to FIG. 3, the health care system for companion animals according to one embodiment may be connected to a database storing questionnaire data (questionnaire big data), and may perform a self-diagnosis process based on a plurality of questionnaire data matching a user's response among the big data stored in the database.

Specifically, the health care system may provide a user with symptom questionnaire data 310 and N pieces of condition questionnaire data 320 corresponding to a user's response to the symptom questionnaire data. In this case, the health care system may provide N−1th condition questionnaire data among the N pieces of condition questionnaire data 320 to the user, and may provide Nth condition questionnaire data corresponding to a user's response to the N−1th condition questionnaire data to the user.

For example, the health care system may provide the symptom questionnaire data 310 to a user, and may receive a user's response of 'vomiting' to the provided symptom questionnaire data 310.

Next, the health care system may provide the user with data that reflects a question "Describe your pet's appetite" as the first condition questionnaire data that corresponds to the user's response of 'vomiting' among questionnaire big data, and may receive a user's response according to the provided question.

Next, the health care system may provide the user with data that reflects a question "Is your pet's abdomen bloating than before?" as the second condition questionnaire data that corresponds to a user's response to the first condition questionnaire data among questionnaire big data, and may receive a user's response according to the provided question.

Likewise, the health care system may provide a question "Is your pet's tongue blue" as the Nth condition questionnaire data that corresponds to a user's response to the N−1th condition questionnaire data among questionnaire big data, and may receive a user's response to the provided question. Then, a self-diagnosis procedure may be completed.

That is, the health care system may narrow the range of diagnosis for health conditions and diseases of a companion animal through self-diagnosis in which the following condition questionnaire data is changed according to a user's response to condition questionnaire data, thereby improving the accuracy of self-diagnosis.

Figure 4:
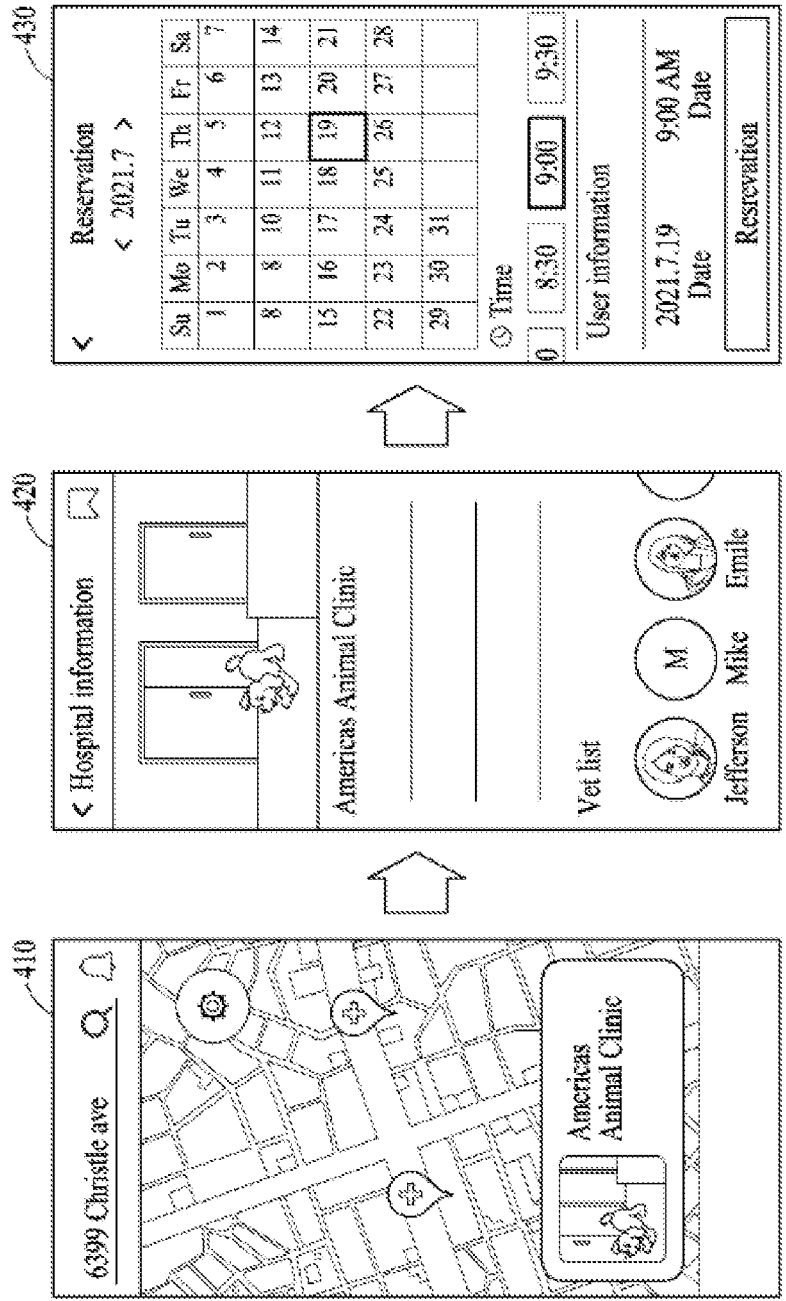
FIG. 4 shows an example of providing an online reservation service for a veterinary hospital through a health care system for companion animals according to one embodiment.

FIG. 4 shows an example of providing an online reservation service for a veterinary hospital through a health care system for companion animals according to one embodiment.

Referring to FIG. 4, as shown in drawing number 410, the health care system for companion animals may recommend at least one veterinary hospital to a user terminal based on the location information of at least one of a user and a companion animal, and the user may select any one of veterinary hospitals displayed on a map based on the location information.

Next, as shown in drawing number 420, the health care system may provide information about the veterinary hospital selected by the user through the user terminal, and the user may select any one of several veterinarians based on the information provided to the terminal.

Next, as shown in drawing number 430, the health care system may provide detailed reservation information for the veterinarian selected by the user through the user terminal, and the user may complete online reservation by selecting reservation date and reservation time in the detailed reservation information provided.

Figure 5A:
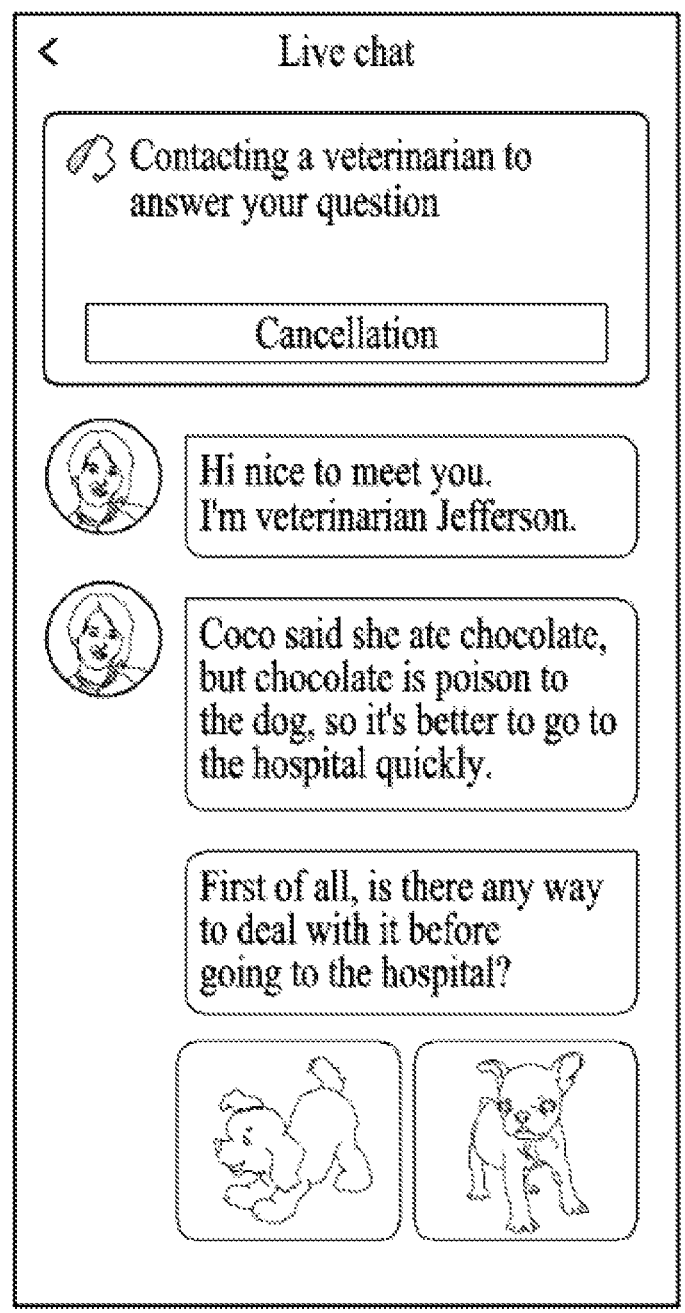
FIGS. 5A and 5B show an example of providing a telemedicine service through a health care system for companion animals according to one embodiment.
Figure 5B:
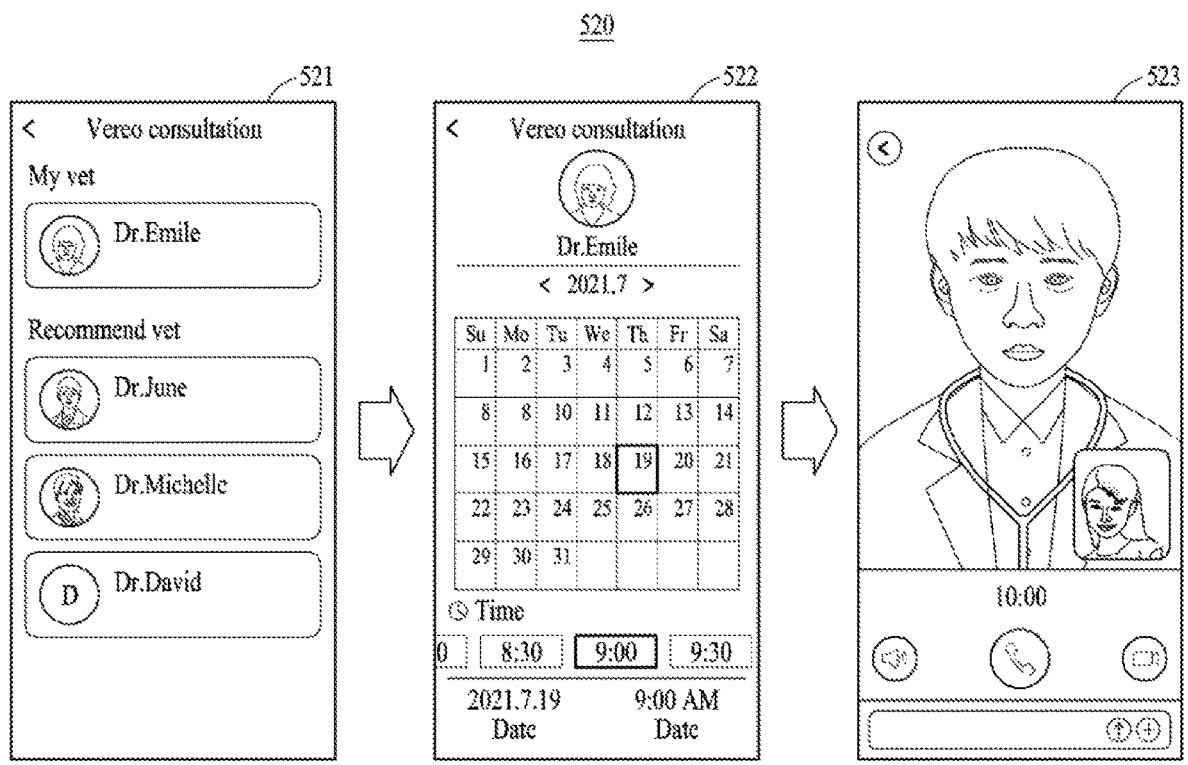
Figure 6A:
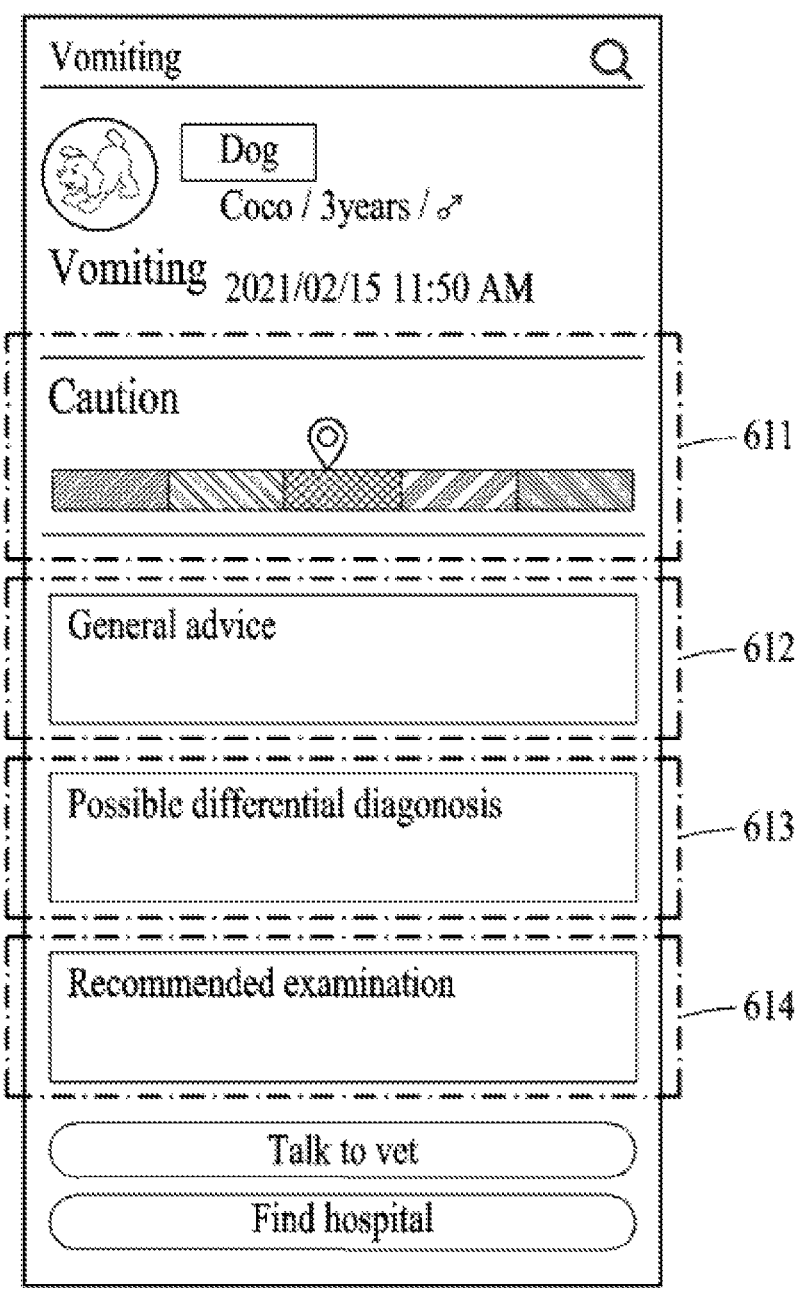
FIGS. 6A to 6F show an example of visualizing the health information of companion animals through a health care system for companion animals according to one embodiment.
Figure 6B:
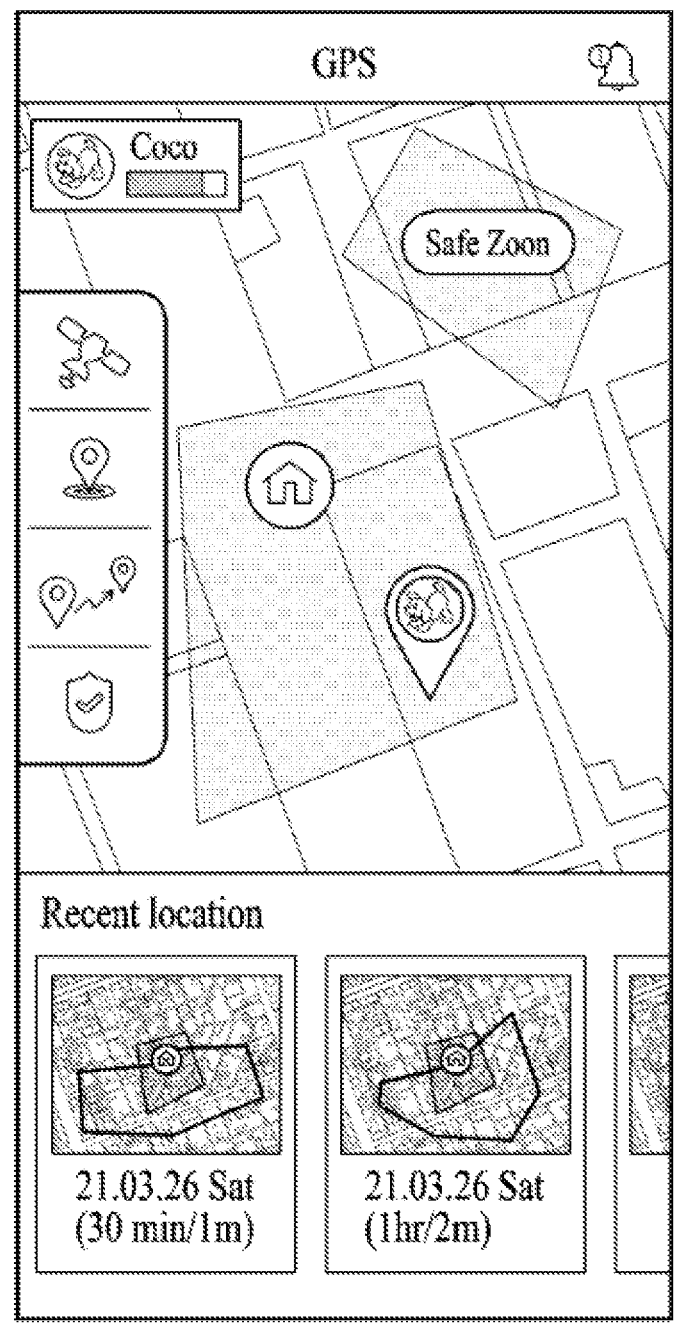
Figure 6C:
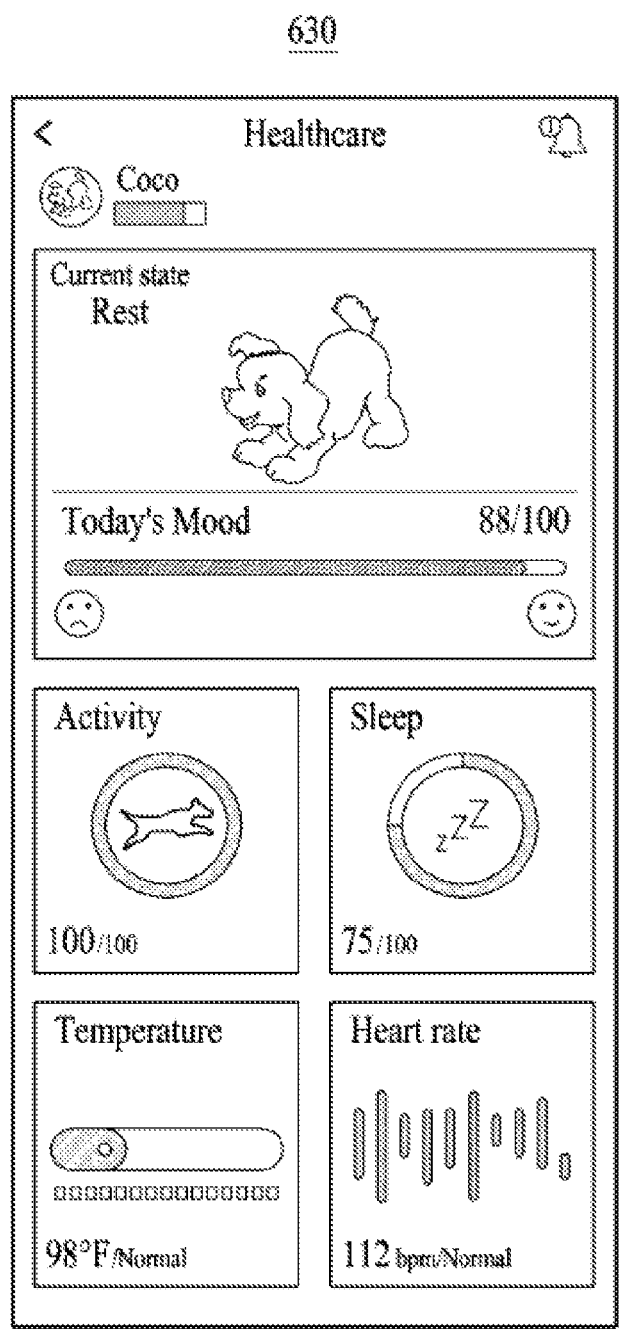
Figure 6D:
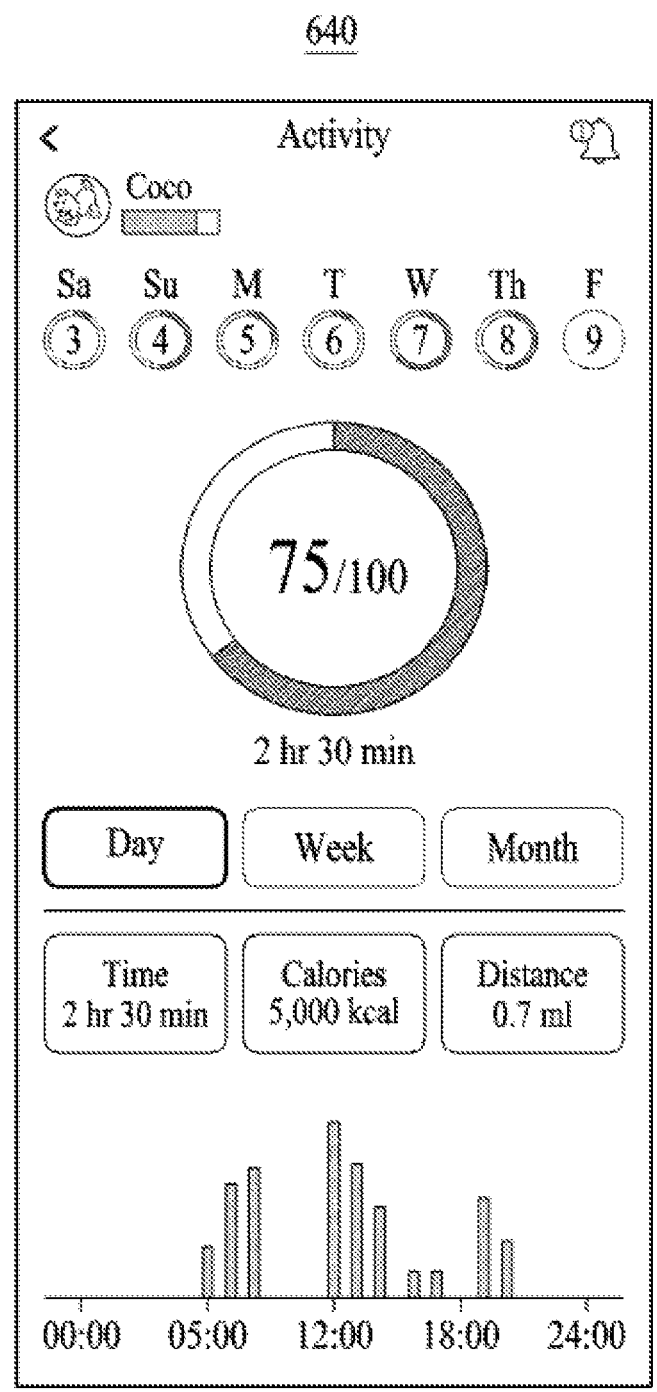
Figure 6E:
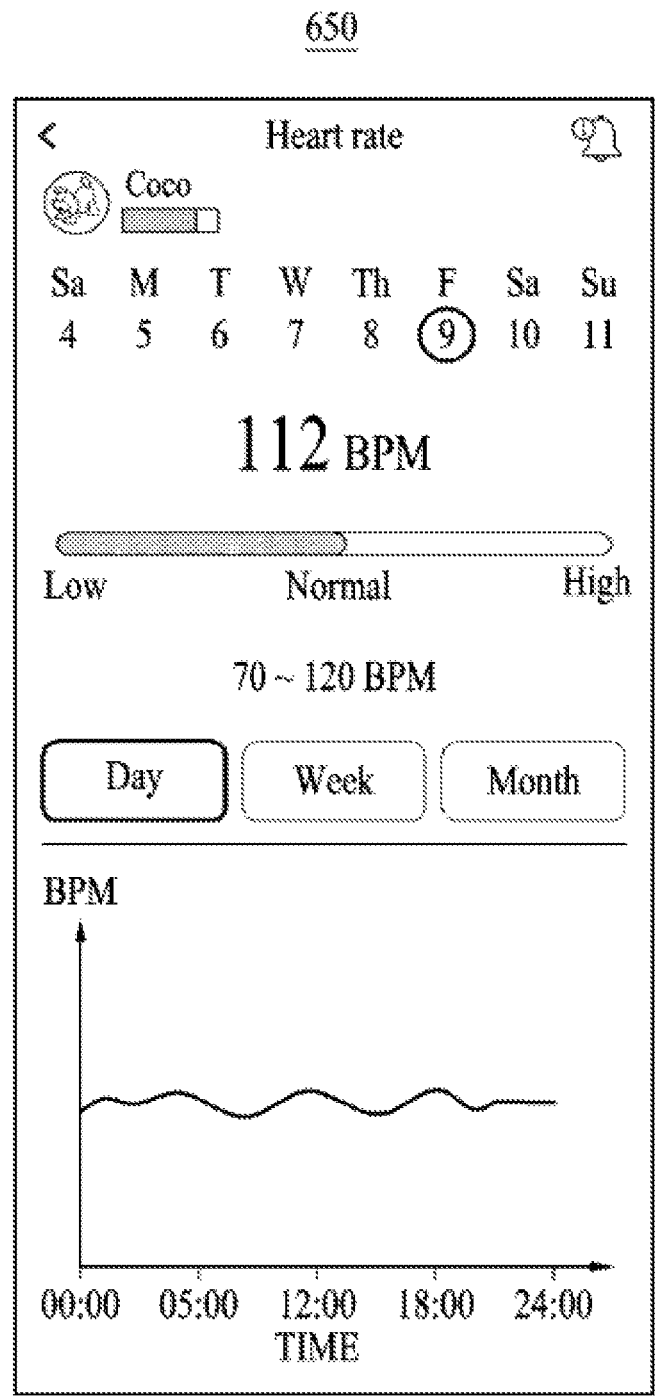
Figure 6F:
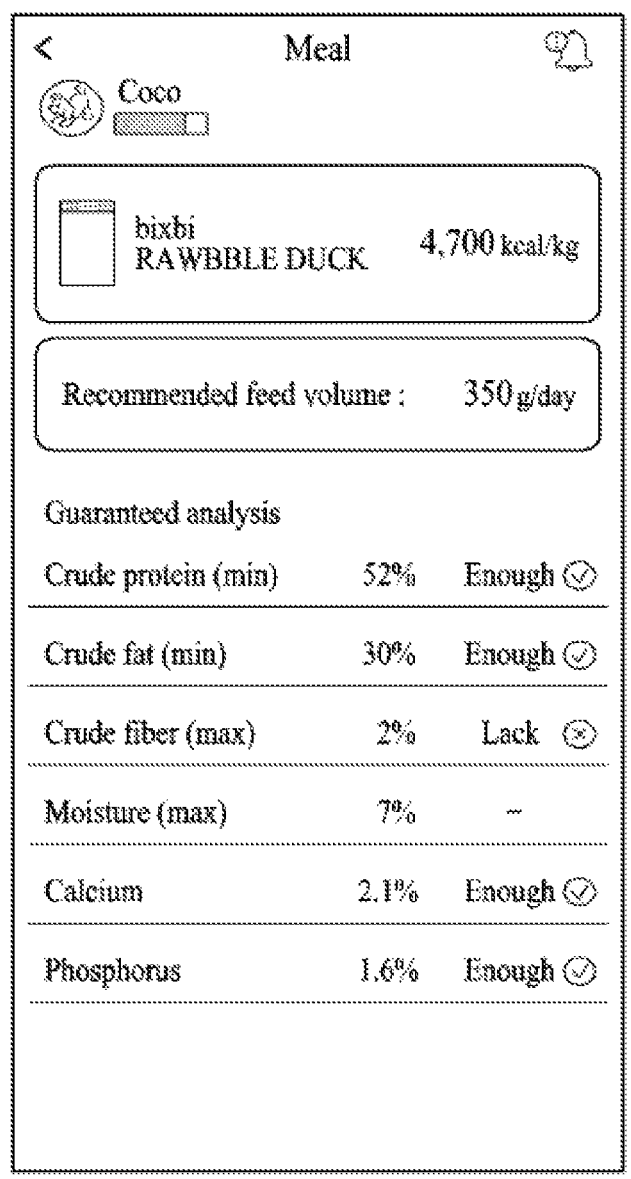

FIGS. 5A and 5B show an example of providing a telemedicine service through a health care system for companion animals according to one embodiment.

Referring to FIGS. 5A and 5B, the health care system for companion animals according to one embodiment may provide at least one service of a live chat-based telemedicine service as shown in drawing number 510 and a video call-based telemedicine service as shown in drawing number 520.

Specifically, the live chat-based telemedicine service may match a user with a veterinarian who is recommended among a plurality of veterinarians in an available pool through the system and may respond in real time, and may provide a telemedicine service through text message/chatting with the matched veterinarian.

In addition, the video call-based telemedicine service may provide a telemedicine service through video call with a veterinarian who is scheduled at a set time through video consultation.

More specifically, as shown in drawing number 521, the health care system may recommend, through a user terminal, at least one veterinarian recommended among a plurality of veterinarians within an available pool through the system, and the user may select any one of recommended veterinarians.

For example, the health care system may recommend at least one veterinarian in consideration of the location information of at least one of a user and a companion animal.

In addition, the health care system may designate a dedicated primary care physician for each type of companion animal in advance. When a veterinarian is recommended, the health care system may control so that a dedicated primary care physician matching the information of a user's companion animal is disposed at the top of a recommendation screen.

Next, as shown in drawing number 522, the health care system may provide detailed reservation information for the veterinarian selected by the user through the user terminal, and the user may select a reservation date and reservation time through the provided detailed reservation information.

Next, as shown in drawing number 523, the health care system may support telemedicine by connecting a video call between the user and the veterinarian selected by the user at the appointment date and time selected by the user.

FIGS. 6A to 6F show an example of visualizing the health information of companion animals through a health care system for companion animals according to one embodiment.

Referring to FIGS. 6A to 6F, the health care system for companion animals according to one embodiment may control lifelog data of a companion animal and information according to a health coaching service to be visualized in a user terminal.

Specifically, as shown in drawing number 610, the health care system may visualize risk information 611, a general advice 612, possible differential diagnosis 613, and recommended examination 614 of a user terminal.

The risk information 611 may be visualized by classifying and displaying the health risk of a companion animal in five stages. The general advice 612 may visualize countermeasures before consultation with a veterinarian according to the level of risk based on symptoms.

In addition, the possible differential diagnosis 613 may visualize possible diagnostic results through the results of self-diagnosis performed focusing on indicator symptoms (main symptoms) in a diagnostic method of veterinary differential diagnosis (DDX) medicine. The recommended examination 614 may visualize information about tests that may be recommended by a veterinary hospital through symptoms and diagnosis, and additionally, a UI through which an online reservation service and a telemedicine service may be provided may be visualized.

As shown in drawing number 620, the health care system may visualize the location information of a companion animal based on a wearable device and a user terminal.

For example, when a user loses a companion animal, a user terminal may check the location of a wearable device and display the wearable device on a map. In this case, the location may be displayed on the map at regular time intervals, and when an event such as movement occurs, the location may be displayed on the map.

For example, areas on the map may also be set as boundaries. In this case, the user terminal may check the location of the wearable device and output an alarm or the like when the companion animal deviates from the corresponding boundary.

In addition, the user terminal may calculate a predicted arrival time based on a destination.

For example, when a user sets a veterinary hospital where the user wants to receive treatment as a destination, and the current location of a wearable device is within a predetermined distance from the veterinary hospital, estimated time of arrival at the hospital may be displayed in the form of a notification or may be notified to the hospital.

In addition, as shown in drawing number 630, the health care system may visualize, on a user terminal, lifelog data of a companion animal, such as activity information (Active), sleep information (Sleep), mood state information (Mood), body temperature information (Temperature), heart rate information (Heart rate), weight information (Weight), and diet information (Meal).

In addition, as shown in drawing numbers 640 to 660, the health care system may visualize, on a user terminal, detailed information about each item of lifelog data of a companion animal (e.g., activity information, sleep information, mood state information, body temperature information, heart rate information, weight information, and diet information).

In addition, the health care system may provide various solutions for a companion animal based on each item of lifelog data of the companion animal.

For example, for a companion animal in need of diet management, solutions such as feed recommendations and diet recommendations may be provided. For a companion animal in need of exercise, solutions such as exercise recommendations may be provided. As a more specific example, time and amount of exercise may be presented, and at the same time, exercise necessary for a companion animal may be recommended in the form of an alarm or the like.

Figure 7A:
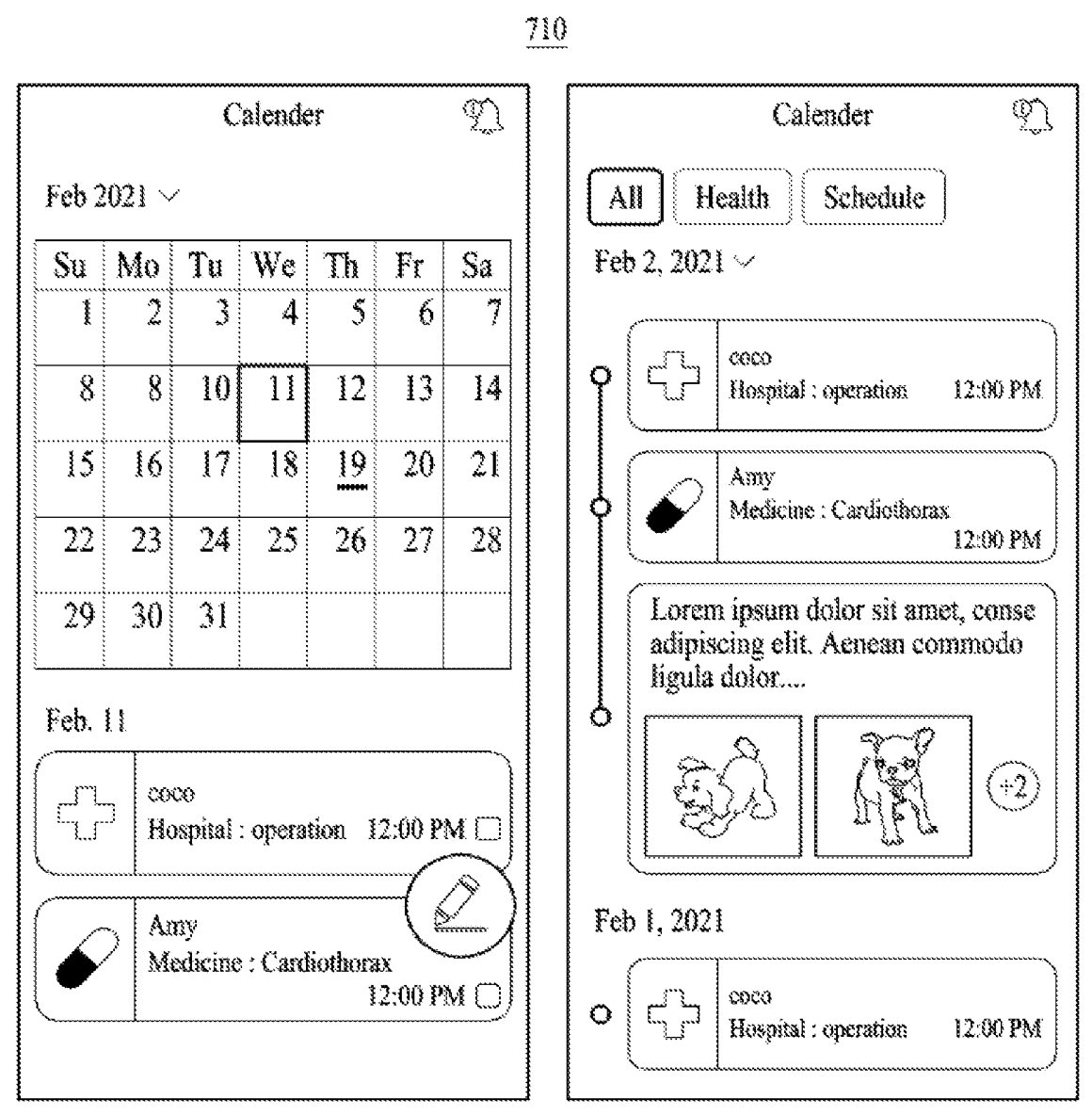
Figure 7B:
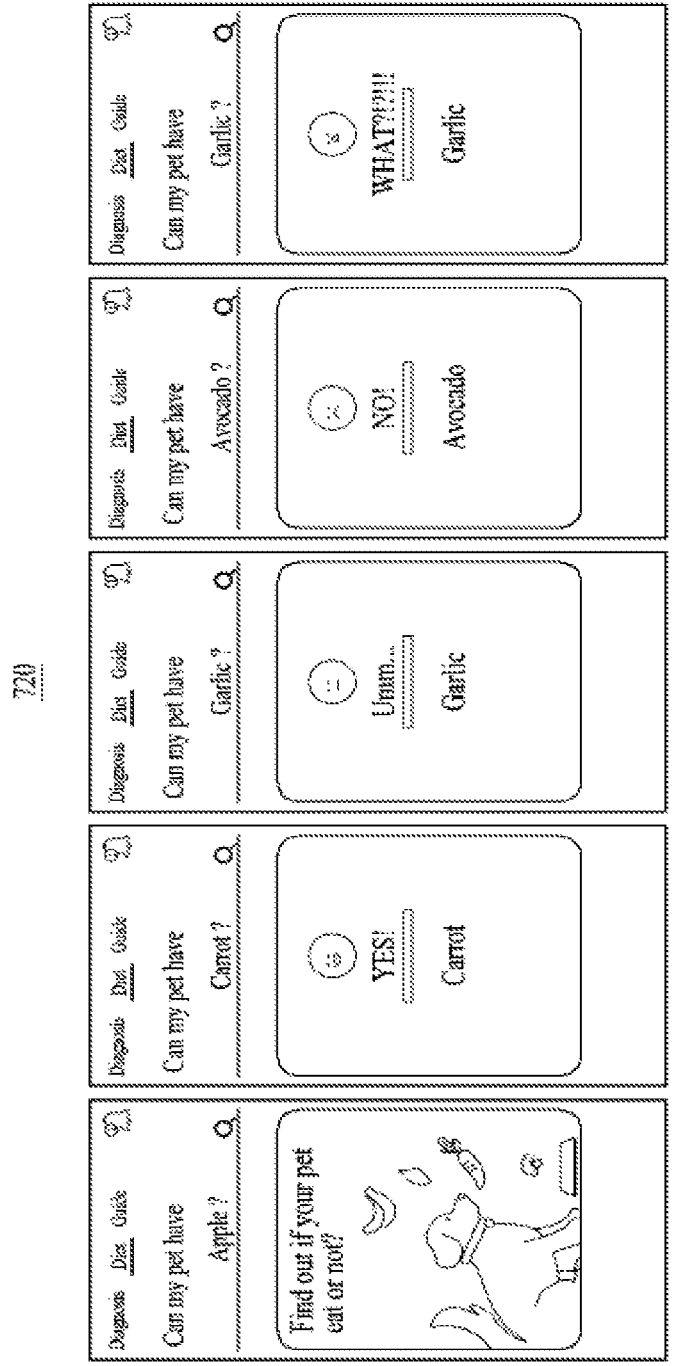

FIGS. 7A and 7B show exemplary supplementary services provided through a health care system for companion animals according to one embodiment.

In FIG. 7A, additional services may be related to general management of vaccination schedules, management information on life patterns, scheduling for medical treatment or regular examinations, walking, and diet.

FIG. 7B shows an example for providing information about edible and inedible foods.

Referring to FIGS. 7A and 7B, in addition to a health coaching service and a medical service, the health care system for companion animals according to one embodiment may provide supplementary services according to additional functions to a user.

Specifically, as shown in drawing number 710, the health care system may provide a function of managing the schedule of a companion animal through a user terminal. The schedule management function may support a companion animal's schedule management function through a calendar, a health-related record function (record of change of feed and abnormal symptoms such as vomiting), and an automatic notification function of a recommended cycle for vaccination, bathing, etc. In addition, the schedule management function may provide a function of providing calendar-based health management records to a veterinarian during telemedicine.

In addition, as shown in drawing number 720, the health care system may provide a companion animal food dictionary function through a user terminal. The food dictionary function may provide information about foods that a companion animal can eat. In addition, according to the food dictionary function, regarding whether food/food ingredients are edible, food/food ingredients may be classified into four levels based on the ASPCA criteria. At this point, efficacy and details may be provided.

Figure 8:
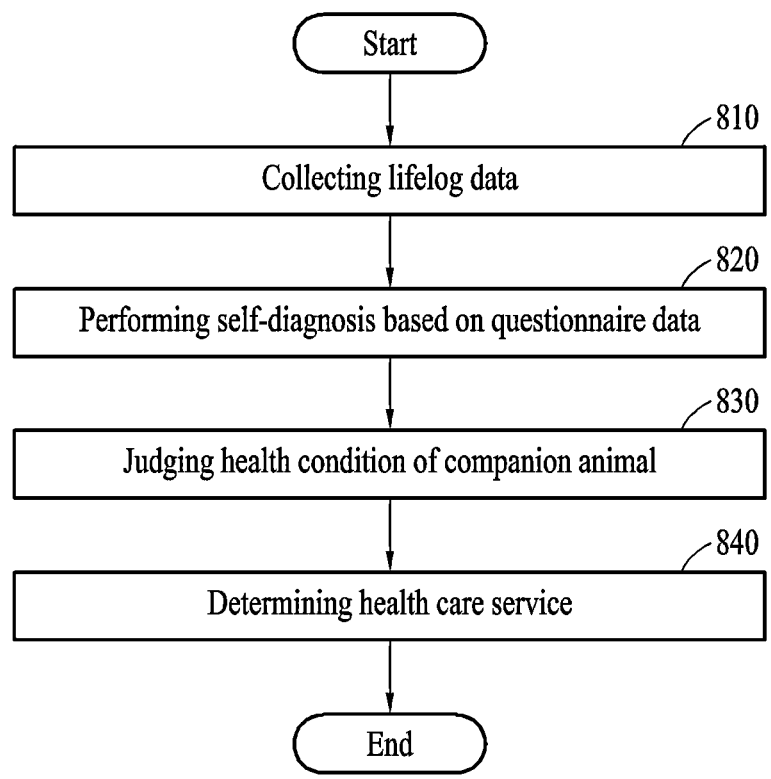
FIG. 8 is a flowchart for explaining a method of managing the health of companion animals according to one embodiment.

FIG. 8 is a flowchart for explaining a method of managing the health of companion animals according to one embodiment.

That is, FIG. 8 is a flowchart for explaining a method of operating the health care system for companion animals according to one embodiment described with reference to FIGS. 1 to 7B. In the following description with reference to FIG. 8, repeated description described with reference to FIGS. 1 to 7B will be omitted.

Referring to FIG. 8, according to the health care method, in step 810, lifelog data including basic information and biometric information about a user's companion animal may be collected by a data collector.

For example, the basic information may include at least one of breed information, age information, weight information, diet information, calorie intake information, medical history information, and inoculation information of a companion animal input by a user.

In addition, the biometric information may include at least one of heart rate information, body temperature information, posture information, voice information, activity information, and behavior information of a companion animal collected by a wearable device worn by the companion animal.

According to the health care method, separately from step 810, in step 820, a plurality of questionnaire data may be provided to a user to perform self-diagnosis of the health condition of a companion animal in a self-diagnosis device, and feedback information reflecting a user's response to the provided questionnaire data may be received from the user.

According to one embodiment, at least one piece of information among self-diagnosis results based on lifelog data and questionnaire data may be used.

According to one aspect of the present disclosure, according to the health care method, in step 820, symptom questionnaire data and N pieces of condition questionnaire data corresponding a user's response to the symptom questionnaire data may be provided to a user by the self-diagnosis device.

Specifically, according to the health care method, in step 820, N−1th condition questionnaire data among N pieces of condition questionnaire data may be provided to a user, and Nth condition questionnaire data corresponding to a user's response to the N−1th condition questionnaire data may be provided to the user by a self-diagnosis device.

For example, the symptom questionnaire data may be information for confirming occurrence of at least one symptom of blindness/visual impairment, epiphora/tear overflow, tear overflow, red eye, blood in the eye, bulging/protruding eye, dilated pupil, eye discharge, eye being out of the socket, eye mass, painful eye, swollen eye, forelimb lameness, limping, hindlimb lameness, limping, multiple joint/limb lameness, limping, muscle wasting/cachexia, joint swelling, broken bone, broken nail, broken tail, fell off something, muscle atrophy, muscle tremors, painful tail, failure to observe oestrus, irregular seasons, infertility in the female with normal oestrus, male infertility, vaginal/vulval discharge, abortion, dystocia, abnormal mammary glands, bleeding from vulva, licking vulva, nursing issues, swollen vulva, vaginal prolapse, whelping issues, pollakiuria/dysuria, excessive urine volume/frequency, polyuria/polydipsia, anuria/oligonuria, not urinating, hematuria, blood in urine, urinary incontinence, urine dribbling, peeing on bed in sleep, strong smelling odor in urine, discolored urine, stranguria/difficulty urinating, behavior problems, altered behavior: general changes, stares blankly at walls, floor, or into space, walking into doors or walls, inability to recognize familiar people or pets, getting lost in home or yard, pacing, excessive vocalizing, scooting, aggressive behavior, anxiety/phobias, fear of thunderstorm, fear of people unfamiliar, compulsive behavior disorders, excessive selfgrooming, flank sucking, repetitive circling, repetitive chewing, inappropriate elimination/defecation/urination, peeing on bed in sleep, licking paw, pacing, not drinking, dental problems, halitosis, bad breath, broken tooth, loose tooth, mass in oral cavity, swelling below the eye socket, painful mouth, other problems, ate digestive medication, ate food with unknown artificial sweetener, ate foreign body, ate gorilla glue or other expanding polyurethane glue, ate hand warmer or oxygen absorber, ate household item, ate medication containing Ivermectin, ate muscle relaxant, ate sago palm, ate stimulants or ADHD medication, ate super glue or other non-expanding glue, ate tobacco or nicotine product, ate urine acidifier or lawn saver supplement, ate/exposed to antibiotics, ate/exposed to plants or flowers, ate/exposed to topical psoriasis medication, bee sting, bitten by black widow or other venomous spider, bitten by unknown spider, bitten by venomous snake or lizard, carbon monoxide poisoning, drank alcoholic beverage, drank coffee/tea or ate caffeinated product, electric shock, gunshot wounds, hit by car, insect bite, rabies exposure, smoke inhalation, stung by scorpion, blindness/visual impairment, epiphora/tear overflow, tear overflow, red eye, blood in the eye, bulging/protruding eye, dilated pupil, eye discharge, eye being out of the socket, eye mass, painful eye, swollen eye, forelimb lameness, limping, hindlimb lameness, limping, multiple joint/limb lameness, limping, muscle wasting/cachexia, joint swelling, broken bone, broken nail, broken tail, fell off something, muscle atrophy, muscle tremors, painful tail, failure to observe oestrus, irregular seasons, infertility in the female with normal oestrus, male infertility, vaginal/vulval discharge, abortion, dystocia, abnormal mammary glands, bleeding from vulva, licking vulva, nursing issues, swollen vulva, vaginal prolapse, whelping issues, pollakiuria/dysuria, excessive urine volume/frequency, polyuria/polydipsia, anuria/oligonuria, not urinating, hematuria, blood in urine, urinary incontinence, urine dribbling, peeing on bed in sleep, strong smelling odor in urine, discolored urine, stranguria/difficulty urinating, behavior problems, altered behavior: general changes, stares blankly at walls, floor, or into space, walking into doors or walls, inability to recognize familiar people or pets, getting lost in home or yard, pacing, excessive vocalizing, scooting, aggressive behavior, anxiety/phobias, fear of thunderstorm, fear of people unfamiliar, compulsive behavior disorders, excessive selfgrooming, flank sucking, repetitive circling, repetitive chewing, inappropriate elimination/defecation/urination, peeing on bed in sleep, licking paw, pacing, not drinking, dental problems, halitosis, bad breath, broken tooth, loose tooth, mass in oral cavity, swelling below the eye socket, painful mouth, other problems, ate digestive medication, ate food with unknown artificial sweetener, ate foreign body, ate gorilla glue or other expanding polyurethane glue, ate hand warmer or oxygen absorber, ate household item, ate medication containing Ivermectin, ate muscle relaxant, ate sago palm, ate stimulants or ADHD medication, ate super glue or other non-expanding glue, ate tobacco or nicotine product, ate urine acidifier or lawn saver supplement, ate/exposed to antibiotics, ate/exposed to plants or flowers, ate/exposed to topical psoriasis medication, bee sting, bitten by black widow or other venomous spider, bitten by unknown spider, bitten by venomous snake or lizard, carbon monoxide poisoning, drank alcoholic beverage, drank coffee/tea or ate caffeinated product, electric shock, gunshot wounds, hit by car, insect bite, rabies exposure, smoke inhalation, and stung by scorpion.

Next, according to the health care method, in step 830, the health condition of a companion animal may be judged based on collected lifelog data and feedback information by a health condition judgment device.

According to one aspect of the present disclosure, according to the health care method, in step 830, a health condition may be judged by the health condition judgment device through an artificial intelligence-based disease judgment model in which collected lifelog data and feedback information are received as input data and at least one of disease information and risk information corresponding to the input data is output.

Next, according to the health care method, in step 840, at least one health care service to be provided to a user among a health coaching service and a medical service may be determined based on the judged health condition by a service determining device. For example, for a companion animal that need diet management, solutions such as feed recommendation and diet recommendation may be determined. For a companion animal that need exercise, solutions such as exercise recommendation may be determined. As a more specific example, time and amount of exercise may be presented, and at the same time, an exercise suitable for a companion animal may be recommended in the form of an alarm or the like.

According to one aspect of the present disclosure, according to the health care method, in step 840, based on the judged health condition, a health coaching service including at least one of a medical service, a telemedicine service, a remote consultation service, a diet management service, an exercise management service, and a lifestyle management service may be provided to a preset user terminal by the service determining device.

In addition, according to the health care method, in step 840, based on the judged health condition, a medical service including at least one of an online reservation service for a veterinary hospital and a telemedicine service may be provided to a preset user terminal by the service determining device.

Accordingly, when the present disclosure is used, in consideration of self-diagnosis results based on lifelog data and questionnaire data of a companion animal, optimized health care services may be provided to the companion animal.

In addition, when the present disclosure is used, through an artificial intelligence-based judgment model, the health condition of a companion animal may be accurately judged.

In addition, when the present disclosure is used, by providing the current health condition of a companion animal and a health care service according to the health condition to a user, the user may efficiently and continuously manage the health of the companion animal.

According to one embodiment, the present disclosure can provide optimized health care services to companion animals in consideration of self-diagnosis results based on lifelog data and questionnaire data of companion animals.

According to one embodiment, the present disclosure can accurately judge the health condition of a companion animal through an artificial intelligence-based judgment model.

According to one embodiment, the present disclosure can provide users with the current health condition of companion animals and health care services according to the health condition so that the users efficiently and continuously manage the health of companion animals.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

[Description of Symbols]

| | | | |
|---|---|---|---|
| 200: | HEALTH CARE SYSTEM | 210: | DATA COLLECTOR |
| 220: | SELF-DIAGNOSIS DEVICE | 230: | HEALTH CONDITION JUDGMENT DEVICE |
| 240: | SERVICE DETERMINING DEVICE | | |

What is claimed is:

1. A health care system for companion animals, the system comprising:
   a memory configured to store computer-readable instructions; and
   one or more processors configured to execute the computer-readable instructions such that the one or more processors are configured to:
   collect lifelog data comprising basic information and biometric information about a companion animal,
   provide a plurality of questionnaire data to a user terminal to perform self-diagnosis of a health condition of the companion animal and receive feedback information reflecting a response of the user terminal to the provided questionnaire data from the user terminal,
   judge a health condition of the companion animal based on the collected lifelog data and the feedback information,
   determine at least one health care service among a health coaching service and a medical service based on the judged health condition, and
   provide the at least one health care service including an online reservation service for a hospital based on location information of the user terminal or location information of a wearable device worn by the companion animal,
   wherein the one or more processors are further configured to provide the user terminal with symptom questionnaire data and N pieces of condition questionnaire data (N being a positive integer) corresponding to a response of the user terminal to the symptom questionnaire data, provide (N−1)th condition questionnaire data among the N pieces of condition questionnaire data to the user terminal, and provide Nth condition questionnaire data corresponding to a response of the user terminal to the (N−1)th condition questionnaire data to the user terminal,
   wherein the one or more processors are further configured to:
   (i) collect atypical disease information including information related to health, diseases, medical treatment or surgery about each of the plurality of companion animals, standardize the collected atypical disease information through a pre-processing process, categorize the standardized disease information, and construct a disease information database using the categorized disease information, and (ii) generate an artificial intelligence (AI)-based disease judgment model through deep learning based on the disease information collected in advance and stored in the disease information database, wherein the one or more processors are further configured to judge the health condition through the AI-based disease judgment model that receives the collected lifelog data and the feedback information as input data and outputs at least one of disease information and risk information corresponding to the input data, and wherein the AI-based disease determination model is characterized by utilizing the diagnostic method of veterinary differential diagnosis (DDx) to narrow down the diagnostic scope, starting with the indicator symptoms and progressively refining the diagnosis through the (N−1)th condition questionnaire data and the Nth condition questionnaire data, and wherein the one or more processors are further configured to:

when it is determined that at least one of the user terminal and the wearable device worn by the companion animal approaches the hospital within a preset distance based on at least one of the location information of the user terminal and the location information of the wearable device worn by the companion animal, (i) transmit a request signal to a terminal of the hospital to induce reception processing of the companion animal to be completed in advance and (ii) provide information necessary for medical treatment of the companion animal to the terminal of the hospital based on the reception processing being completed.

2. The health care system according to claim 1, wherein the basic information comprises at least one of breed information, age information, weight information, diet information, calorie intake information, medical history information, and inoculation information of the companion animal.

3. The health care system according to claim 1, wherein the biometric information comprises at least one of heart rate information, body temperature information, posture information, voice information, activity information, and behavior information of the companion animal collected through a wearable device worn by the companion animal.

4. The health care system according to claim 1, wherein the symptom questionnaire data is information for confirming specific diseases and health conditions based on at least one symptom of blindness/visual impairment, epiphora/tear overflow, tear overflow, red eye, blood in the eye, bulging/protruding eye, dilated pupil, eye discharge, eye being out of the socket, eye mass, painful eye, swollen eye, forelimb lameness, limping, hindlimb lameness, limping, multiple joint/limb lameness, limping, muscle wasting/cachexia, joint swelling, broken bone, broken nail, broken tail, fell off something, muscle atrophy, muscle tremors, painful tail, failure to observe oestrus, irregular seasons, infertility in the female with normal oestrus, male infertility, vaginal/vulval discharge, abortion, dystocia, abnormal mammary glands, bleeding from vulva, licking vulva, nursing issues, swollen vulva, vaginal prolapse, whelping issues, pollakiuria/dysuria, excessive urine volume/frequency, polyuria/polydipsia, anuria/oliguria, not urinating, hematuria, blood in urine, urinary incontinence, urine dribbling, peeing on bed in sleep, strong smelling odor in urine, discolored urine, stranguria/difficulty urinating, behavior problems, altered behavior: general changes, stares blankly at walls, floor, or into space, walking into doors or walls, inability to recognize familiar people or pets, getting lost in home or yard, pacing, excessive vocalizing, scooting, aggressive behavior, anxiety/phobias, fear of thunderstorm, fear of people unfamiliar, compulsive behavior disorders, excessive selfgrooming, flank sucking, repetitive circling, repetitive chewing, inappropriate elimination/defecation/urination, peeing on bed in sleep, licking paw, pacing, not drinking, dental problems, halitosis, bad breath, broken tooth, loose tooth, mass in oral cavity, swelling below the eye socket, painful mouth, other problems, ate digestive medication, ate food with unknown artificial sweetener, ate foreign body, ate gorilla glue or other expanding polyurethane glue, ate hand warmer or oxygen absorber, ate household item, ate medication containing Ivermectin, ate muscle relaxant, ate sago palm, ate stimulants or ADHD medication, ate super glue or other non-expanding glue, ate tobacco or nicotine product, ate urine acidifier or lawn saver supplement, ate/exposed to antibiotics, ate/exposed to plants or flowers, ate/exposed to topical psoriasis medication, bee sting, bitten by black widow or other venomous spider, bitten by unknown spider, bitten by venomous snake or lizard, carbon monoxide poisoning, drank alcoholic beverage, drank coffee/tea or ate caffeinated product, electric shock, gunshot wounds, hit by car, insect bite, rabies exposure, smoke inhalation, stung by scorpion, blindness/visual impairment, epiphora/tear overflow, tear overflow, red eye, blood in the eye, bulging/protruding eye, dilated pupil, eye discharge, eye being out of the socket, eye mass, painful eye, swollen eye, forelimb lameness, limping, hindlimb lameness, limping, multiple joint/limb lameness, limping, muscle wasting/cachexia, joint swelling, broken bone, broken nail, broken tail, fell off something, muscle atrophy, muscle tremors, painful tail, failure to observe oestrus, irregular seasons, infertility in the female with normal oestrus, male infertility, vaginal/vulval discharge, abortion, dystocia, abnormal mammary glands, bleeding from vulva, licking vulva, nursing issues, swollen vulva, vaginal prolapse, whelping issues, pollakiuria/dysuria, excessive urine volume/frequency, polyuria/polydipsia, anuria/oliguria, not urinating, hematuria, blood in urine, urinary incontinence, urine dribbling, peeing on bed in sleep, strong smelling odor in urine, discolored urine, stranguria/difficulty urinating, behavior problems, altered behavior: general changes, stares blankly at walls, floor, or into space, walking into doors or walls, inability to recognize familiar people or pets, getting lost in home or yard, pacing, excessive vocalizing, scooting, aggressive behavior, anxiety/phobias, fear of thunderstorm, fear of people unfamiliar, compulsive behavior disorders, excessive selfgrooming, flank sucking, repetitive circling, repetitive chewing, inappropriate elimination/defecation/urination, peeing on bed in sleep, licking paw, pacing, not drinking, dental problems, halitosis, bad breath, broken tooth, loose tooth, mass in oral cavity, swelling below the eye socket, painful mouth, other problems, ate digestive medication, ate food with unknown artificial sweetener, ate foreign body, ate gorilla glue or other expanding polyurethane glue, ate hand warmer or oxygen absorber, ate household item, ate medication containing Ivermectin, ate muscle relaxant, ate sago palm, ate stimulants or ADHD medication, ate super glue or other non-expanding glue, ate tobacco or nicotine product, ate urine acidifier or lawn saver supplement, ate/exposed to antibiotics, ate/exposed to plants or flowers, ate/exposed to topical psoriasis medication, bee sting, bitten by black widow or other venomous spider, bitten by unknown spider, bitten by venomous snake or lizard, carbon monoxide poisoning, drank alcoholic beverage, drank coffee/tea or ate caffeinated product, electric shock, gunshot wounds, hit by car, insect bite, rabies exposure, smoke inhalation, and stung by scorpion.

5. The health care system according to claim 1, wherein the one or more processors learn the disease judgment model based on artificial intelligence and perform a process of judging a health condition using the learned disease judgment model.

6. The health care system according to claim 1, wherein the one or more processors provide, based on the judged health condition, the health coaching service comprising at least one of a medical service, a telemedicine service, a remote consultation service, a diet management service, an exercise management service, and a lifestyle management service to a preset user terminal.

7. The health care system according to claim 1, wherein the one or more processors provide, based on the judged health condition, the medical service comprising at least one of an online reservation service for a veterinary hospital and a telemedicine service to a preset user terminal.

8. The health care system according to claim 7, wherein the online reservation service for a veterinary hospital is a service that recommends at least one veterinary hospital through the user terminal based on location information of at least one of the user and the companion animal and makes an online reservation for a veterinary hospital selected by the user from among the recommended veterinary hospitals.

9. The health care system according to claim 7, wherein the telemedicine service is a service that matches the user with at least one veterinarian recommended through a system among a plurality of veterinarians within an available pool and provides remote consultation or telemedicine between the matched veterinarian and the user based on at least one of text message, chatting, and video call.

10. The health care system according to claim 9, wherein the one or more processors match the at least one veterinarian with the user based on location information of at least one of the user and the companion animal.

11. The health care system according to claim 9, wherein the one or more processors provide at least one of the collected lifelog data, the feedback information, and the judged health condition information to a terminal of the matched veterinarian.

12. The health care system according to claim 1, wherein the one or more processors control at least one of the collected lifelog data and information according to the health coaching service to be visualized in a preset user terminal.

13. A method of managing health of a companion animal, the method comprising steps performed by one or more processors and comprising:
 collecting lifelog data comprising basic information and biometric information about a companion animal;
 providing a plurality of questionnaire data to a user terminal to perform self-diagnosis of a health condition of the companion animal and receiving feedback information reflecting a response of the user to the provided questionnaire data from the user terminal;
 judging a health condition of the companion animal based on the collected lifelog data and the feedback information;
 determining at least one health care service among a health coaching service and a medical service based on the judged health condition; and
 providing the at least one health care service including an online reservation service for a hospital based on location information of the user terminal or location information of a wearable device worn by the companion animal,
wherein the step of providing the plurality of questionnaire data comprises the steps of:
 providing the user terminal with symptom questionnaire data and N pieces of condition questionnaire data (N being a positive integer) corresponding to a response of the user terminal to the symptom questionnaire data,
 providing (N−1)th condition questionnaire data among the N pieces of condition questionnaire data to the user terminal, and
 providing Nth condition questionnaire data corresponding to a response of the user terminal to the (N−1)th condition questionnaire data to the user terminal,
wherein the method further comprises:
(i) collecting atypical disease information including information related to health, diseases, medical treatment or surgery about each of the plurality of companion animals, standardizing the collected atypical disease information through a pre-processing process, categorizing the standardized disease information, and constructing a disease information database using the categorized disease information, and
(ii) generating an artificial intelligence (AI)-based disease judgment model through deep learning based on the disease information collected in advance and stored in the disease information database,
wherein the step of judging the health condition comprises the steps of:
 judging the health condition through the AI-based disease judgment model that receives the collected lifelog data and the feedback information as input data and outputs at least one of disease information and risk information corresponding to the input data, and
wherein the AI-based disease determination model is characterized by utilizing the diagnostic method of veterinary differential diagnosis (DDx) to narrow down the diagnostic scope, starting with the indicator symptoms and progressively refining the diagnosis through the (N−1)th condition questionnaire data and the Nth condition questionnaire data, and
wherein the method further comprises:
 when it is determined that at least one of the user terminal and the wearable device worn by the companion animal approaches the hospital within a preset distance based on at least one of the location information of the user terminal and the location information of the wearable device worn by the companion animal, (i) transmitting a request signal to a terminal of the hospital to induce reception processing of the companion animal to be completed in advance and (ii) providing information necessary for medical treatment of the companion animal to the terminal of the hospital based on the reception processing being completed.

* * * * *